United States Patent [19]
Culley

[11] Patent Number: 5,109,521
[45] Date of Patent: Apr. 28, 1992

[54] SYSTEM FOR RELOCATING DYNAMIC MEMORY ADDRESS SPACE HAVING RECEIVED MICROPROCESSOR PROGRAM STEPS FROM NON-VOLATILE MEMORY TO ADDRESS SPACE OF NON-VOLATILE MEMORY

[75] Inventor: Paul R. Culley, Houston, Tex.

[73] Assignee: Compaq Computer Corporation, Houston, Tex.

[21] Appl. No.: 477,187

[22] Filed: Feb. 5, 1990

Related U.S. Application Data

[63] Continuation of Ser. No. 905,074, Sep. 8, 1986, abandoned.

[51] Int. Cl.⁵ .................. G06F 13/00; G06F 3/00
[52] U.S. Cl. .................. 395/800; 364/DIG. 2; 364/970.2; 364/964; 364/974
[58] Field of Search ... 364/200 MS File, 900 MS File

[56] References Cited

U.S. PATENT DOCUMENTS

| | | | |
|---|---|---|---|
| 4,245,301 | 1/1981 | Rokutanda et al. | 364/200 |
| 4,310,901 | 1/1982 | Harding et al. | 371/21 |
| 4,456,966 | 6/1984 | Bringol et al. | 364/900 |
| 4,462,086 | 7/1984 | Kurakake | 364/900 |
| 4,481,627 | 11/1984 | Beauchesne et al. | 371/21 |
| 4,584,663 | 4/1986 | Tanikawa | 371/21 |
| 4,590,556 | 5/1986 | Berger et al. | 364/200 |
| 4,769,767 | 9/1988 | Hilbrink | 364/200 |

FOREIGN PATENT DOCUMENTS

| | | | |
|---|---|---|---|
| 1023056 | 12/1977 | Canada | 354/246 |
| 58-14260 | 1/1983 | Japan . | |
| 59-79351 | 5/1984 | Japan . | |
| 59-154543 | 9/1984 | Japan . | |

Primary Examiner—Thomas C. Lee
Assistant Examiner—L. Donaghue
Attorney, Agent, or Firm—Pravel, Gambrell, Hewitt, Kimball & Krieger

[57] ABSTRACT

A personal computer transfers the contents of the computer's slow 16 bit read only memory (ROM) into the computer's fast 32 bit random access memory (RAM), remaps the RAM space to include the ROM space and disables the ROM. Portions of the RAM are tested before the contents are transferred. After the transfer the computer operates out of the RAM. Additionally, the RAM address space containing the ROM contents can selectively be made write protected so that the data cannot be changed.

4 Claims, 8 Drawing Sheets

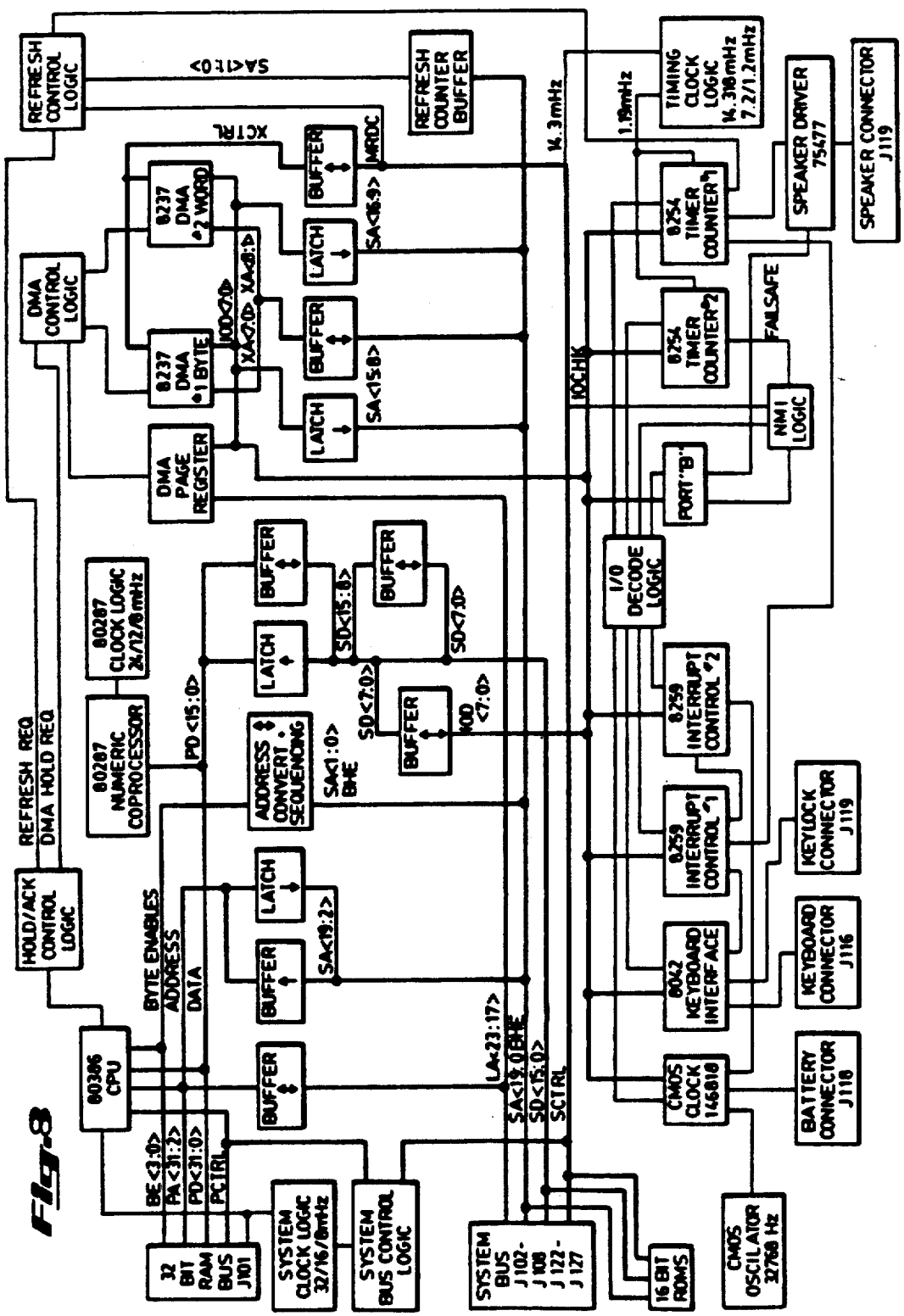

SYSTEM FOR RELOCATING DYNAMIC MEMORY ADDRESS SPACE HAVING RECEIVED MICROPROCESSOR PROGRAM STEPS FROM NON-VOLATILE MEMORY TO ADDRESS SPACE OF NON-VOLATILE MEMORY

This is a continuation of co-pending application Ser. No. 905,074 filed on Sep. 8, 1986, now abandoned.

BACKGROUND OF THE INVENTION

This invention relates to personal computers designed with commercially available microprocessor chip sets. More particularly, the present invention relates to a personal computer which has a 32-bit microprocessor, a 32-bit random access memory, an 8/16-bit bus controller and a 16- bit read only memory (ROM). It has long been the practice to store the basic input/output system (BIOS) in the computer ROM. The ROM chips retain the program (BIOS) in memory even when the chips (or personal computer is de-energized. The basic input/output system (BIOS) controls the operation of the microprocessor and is one of the key elements in achieving and maintaining compatibility with the standards in the industry.

With the advent of a 32-bit processor the limiting factor in computer speed, whenever calls are made to the system BIOS, has been the call by a 32-bit device to a 16-bit memory through the 8/16-bit bus controller.

The introduction of the personal computer has resulted in a tremendous amount of application software programs written for both the professional and for the home entertainment market. These personal computers are designed around commercially available microprocessor chip sets which may include a plurality of microprocessors connected in an architecture which results in varying degrees of execution throughput rates.

Maintaining compatibility with commercially available computer programs requires that calls made to the BIOS by the third party software produce essentially the same results from one generation of computers to the other. Stated another way the call to the BIOS in the earlier generation computer must be handled in a similar manner in the new generation computer in order to produce the same results. The compatibility requirements thus dictate that no significant changes be made to the specific instructions stored in the BIOS or the address locations of the instructions. This requires that new computers with new generation microprocessors be structured with a similar instructions in the BIOS, similar instruction sets, and the same addresses for those instructions.

Popular microprocessor chip sets are those such as the ones manufactured by Intel Corporation (hereafter referred to as Intel), known commonly as 8088 microprocessor, 8086 microprocessor and the 80286 microprocessor, all having similar instruction sets. Similar instruction sets are also available for a new generation microprocessor from Intel, the 80386 microprocessor. The 80386 microprocessor has a substantially higher execution cycle rate, almost three times faster than the 80286. Available also from Intel is a co-processor chip, the Intel 80287, which may be used either with the 80386 or the 80386 microprocessor chips to achieve even higher execution throughput rates.

With the availability of a software compatible (i.e., executes the same instruction set) microprocessor, it is possible to upgrade a prior-art personal computer with higher execution speeds for some application programs written for the lower speed microprocessor chip sets. While faster software compatible microprocessors are available, it has not been possible, in the past to speed up all microprocessor operations by simply changing over to a newer and faster microprocessor to produce a personal computer which executes at a faster speed for all of the application programs written for the slower microprocessors. One of the limitations encountered in an upgrade of the microprocessor is the need for a 32-bit processor to access a 16-bit memory at the old microprocessor memory access rate.

It is undeniable that providing a personal computer capable of executing application programs written for slower microprocessors in a third of the time would be of a commercial advantage in the marketplace, but such a device would not be commercially attractive unless it were able to execute all the application programs written for slower speed microprocessors. For example, it is possible to provide a personal computer having an Intel 80386, 80287 microprocessor pair (a high speed microprocessor) rather than an 80386, 80287 microprocessor pair (a slower speed microprocessor) and run the high speed microprocessor at higher clocking frequencies (rates). Unfortunately, these simple changes do not result in a personal computer which is software compatible for all varieties of application programs.

Even though the previous microprocessor chip sets, (i.e. 8086, 8088, 80286 ) are software compatible, the internal design of the microprocessors is not the same. This difference in internal design, depending upon the design of the application program, i.e., does it contain a lot of program jumps, affects the execution speed of a given application program. The execution time at the high speed for the high speed microprocessor is not necessarily proportionally faster than the execution time when microprocessor clock is set to the slower normal frequency for the slow speed microprocessor. Stated differently, reducing the microprocessor clock from a high speed mode to the normal clock for the slow speed microprocessor while keeping all else the same does not result in the same execution time for a given application program to run on the high speed microprocessor as occurs if the same program is run on the slow speed microprocessor.

For the Intel 80386 microprocessor, simply reducing the clocking frequency to the clocking frequency of an 8088, or 8086, or 80286 microprocessor results in an execution speed which is faster than it would have been for the slow speed 8088 microprocessor chip. This faster execution speed results from the internal design differences which exist between the microprocessors, and the fact that the 80386 requires 32-bit fetches from memory while the 8088 requires 8-bit fetches, the 8086 requires 16-bit fetches and the 80286 requires 32-bit fetches using two 16-bit parallel paths.

The internal design difference between these microprocessors is primarily in the amount of pre-fetch buffer memory provided in the microprocessor. In the Intel 8088, there are four bytes of pre-fetch queue, in the 8086, there are six bytes of pre-fetch queue, in the 80286, there are 8 bytes of pre-fetch queue while in the 80386 there are 12 bytes of pre-fetch queue. Each microprocessor is designed to keep its pre-fetch queue full of information in order that the microprocessor can continue to execute code, which on the average, achieves a desired execution throughput rate. When program jumps occur, the contents of the pre-fetch buffer are lost. This loss of information is reflected in wasted execution time because of the time required to obtain the pre-fetch information that is thrown away. Thus, the 8088 microprocessor, having four bytes of pre-fetch queue running at a given clocking frequency and fetching 8-bit bytes per fetch cycle would produce different execution throughput than the 80386 having 12 bytes of pre-fetch queue running at the same clocking frequency but fetching 32-bit bytes per fetch cycle. It is because of this difference in the pre-fetch buffer capacity and the rate at which 32-bit bytes are fetched from memory that the 80386 runs at a faster speed for the same application program when the 80386 microprocessor is run at the same clocking frequency as is normally used for the slower microprocessor e.g. 8088.

Therefore, it would be advantageous to provide a personal computer which provides for a high speed microprocessor to execute application programs while accessing and executing BIOS instructions at a 32-bit rate without any significant loss in the compatibility with application programs written for older generation microprocessors.

RELATED APPLICATIONS

This application is filed concurrently with U.S. patent application Ser. No. 905,075 entitled "PRIORITY ARBITRATION CIRCUIT FOR PROCESSOR ACCESS", now U.S. Pat. No. 4,787,032 issues on Nov. 22, 1988 and U.S. patent application Ser. No. 904,982 entitled "COMPUTER SYSTEM SPEED CONTROL AT CONTINUOUS PROCESSOR SPEED"; these concurrent applications having a common assignee and common inventor. Additionally a related application is co-pending U.S. patent application Ser. No. 626,912, filed Jun. 27, 1984 issued as U.S. Pat. No. 4,727,491 on Feb. 23, 1988, having a common assignee and inventor.

SUMMARY OF THE INVENTION

In accordance with the present invention, there is disclosed a personal computer having a high speed microprocessor and a system BIOS initially stored in a read only memory (ROM), during the initial power-up of the system, with the BIOS subsequently transferred to a high speed random access memory (RAM) after part of the RAM is tested during the power-up sequence.

In the preferred embodiment the invention is implemented by first powering up the personal computer and beginning execution of the RAM system test from ROM. During the initial power up, the RAM system is tested and the BIOS initiates the copying of the ROM to a portion of the RAM address space which is copied into the same address spaces occupied by the BIOS stored in ROM. When this is done, the ROM code writes the control bit which causes the RAM system to take over the ROM address space and from then on the processor executes out of the high speed RAM thereby permitting the high speed microprocessor to obtain and execute instructions from a high speed dynamic memory.

In accordance with the present invention, the personal computer is equipped with a 32-bit microprocessor, a 16-bit co-processor (sometimes referred to as a numeric processor), 32-bit dynamic memory, a clock generator, a 32-bit bus, a 32-bit to 8/16-bit bus controller, an 8/16-bit read only memory (ROM), and 8/16-bit input/output ports.

It is an object of the present invention to implement the invention in hardware, software or any combination thereof. It is a further object of the present invention to achieve compatibility with older and slower 8-bit and 16-bit microprocessors by utilizing similar instruction sets and a similar basic input/output system and instructions.

The personal computer disclosed herein includes a logic means which transfers the basic input/output system (BIOS) from the ROM to RAM as soon as the RAM has been tested by the initialization of the memory test routine in the BIOS.

BRIEF DESCRIPTION OF THE DRAWINGS

For a fuller understanding of the preset invention, reference should be had to the following detailed description of the preferred embodiment of the invention taken in conjunction with the accompanying drawings in which:

FIG. 8 is a block diagram of the functions included on the system board.

Similar reference numerals refer to similar parts throughout the several views of the drawings.

DETAILED DESCRIPTION OF THE PREFERRED EMBODIMENT OF THE INVENTION

Figure 1:
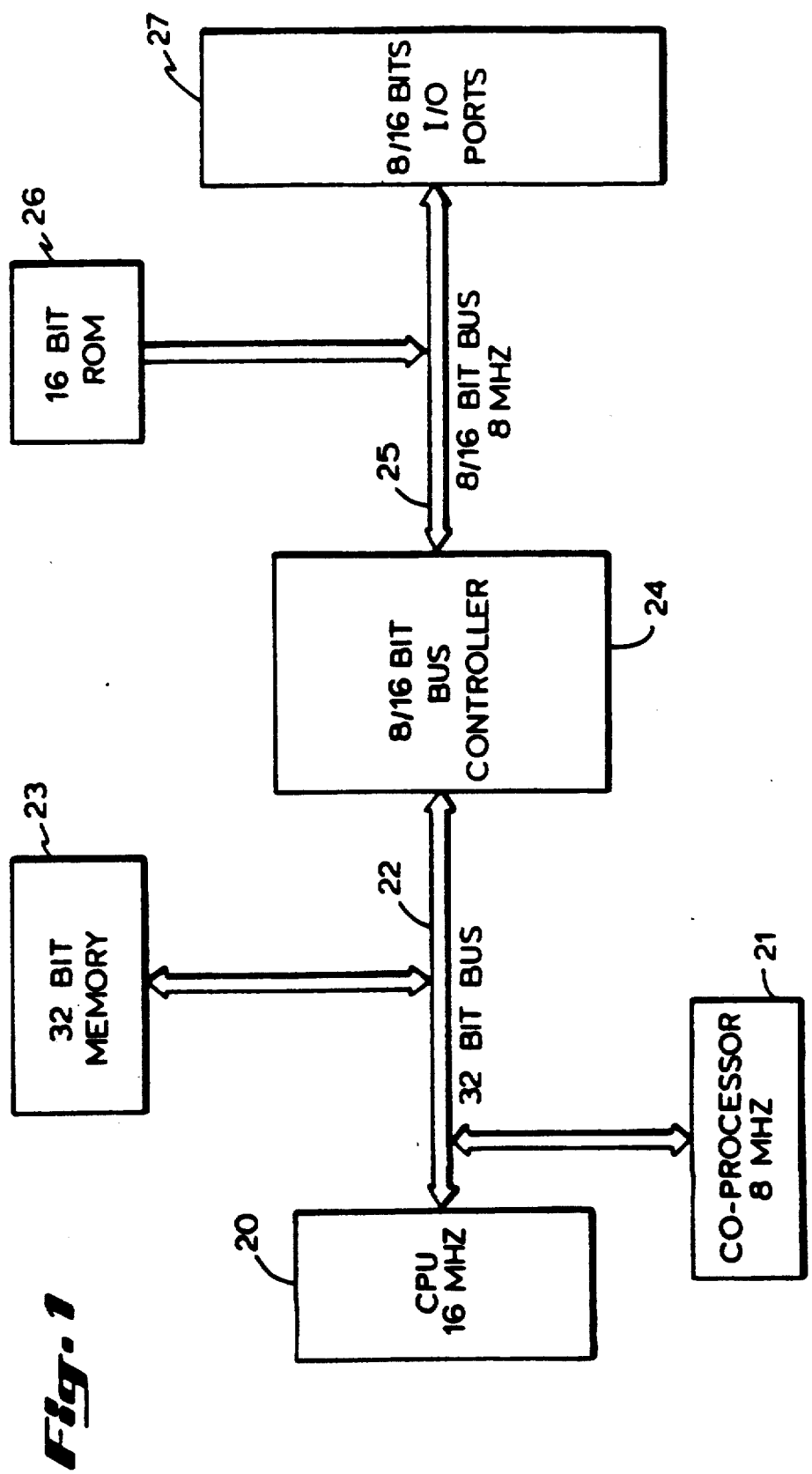
FIG. 1, is a functional block diagram of the architecture of the present invention.

Through the following detailed description of the preferred embodiment of the present invention, and shown in the accompanying drawings, the following notation has been adopted for indicating signals. Since the terms "1" and "0" and "true" and "false" can be ambiguous, their use is avoided. In their place the terms "logic high" (H) and "logic low" (L), in association with "active" and "inactive" states for how the signals have been used. An asterisk (*) following a signal name indicates that the signal is "active" when low. For example, the HOLD request signal to the microprocessor is designated HRQ* and is active when at a logic low state, while the REFRESH signal designated as REFRS and is active when in a logic high state. The signals are "inactive" when in the logic state opposite to its "active" logic state. In our example, HRQ* is inactive when in the logic high state, and the signal REFRS is inactive when in the logic low state.

Certain logic circuit functions of the preferred embodiment of the present invention have been constructed using Programmable Array Logic (PAL) chips in implementing the combinational logic required to combine certain ones of the logic signals to obtain additional logic signals. For such devices and where necessary to practice the present invention, the combinational logic circuits implemented with the PAL chips are neither shown in the drawings or discussed in the specifications; however, the logic design data for producing each PAL chip contained in the invention and illustrated in the drawings is provided in this specification as an appendix. The PAL design data presents the logic equations for combining the input signals to produce the output signals indicated in the drawings. For these design equations and the type of PAL chip to be programmed, it is possible to produce the particular chip using standard manufacturing techniques suggested by the PAL chip manufacturer.

A speed control feature of the present invention has been implemented in the preferred embodiment to provide compatibility with a number of software products that contain programs dependent on certain system speeds. Typically, these programs contain timing idiosyncrasies associated with diskette copy protection mechanisms. The system speed control hardware in the preferred embodiment can also automatically detect the occurrence of timing-dependent programs and thereby adjust the overall program execution speed to simulate a system speed compatible with the copy protection mechanisms. The speed control function described herein is also useful for adjusting the personal computer program execution speed to handle action software games written for 8088-based personal computers. Reduction of the system speed to simulate the system speed of an 8088-based personal computer allows these games to be played at a realistic speed.

The simulated system speed control is accomplished by reducing the system bus bandwidth using extended REFRESH cycles. Since the CPU is in a HOLD state during REFRESH cycles, the apparent execution speed of programs is reduced as the length of the REFRESH cycles are increased. The lengthening of the REFRESH cycles, however, has been carefully implemented so as not to reduce the DMA latency period that would be present during REFRESH cycles of normal length. A DMA request for access to the bus cycle is granted access to the bus immediately, since the CPU is already in the HOLD state. The amount of time added to the normal REFRESH cycle period is determined by the length of a one-shot time period output by one of the Intel 8254 timers in the system.

A RESET/HOLD arbitration circuit has been implemented in the preferred embodiment of the present invention by adding a flip-flop arbitration circuit to the HOLD and RESET lines to prevent these signals from occurring simultaneously. This arbitration circuit causes a RESET signal to wait until after any pending HOLD request is serviced or causes the HOLD signal to wait until after the RESET is completed, depending on which signal is received first at the input to the arbitration flip-flop.

The implementation of the RESET/HOLD arbitration circuit in a personal computer with an 80386 microprocessor restores compatibility to application programs, written for an 80286 microprocessor, which utilized the extended address space of the microprocessor in what is called the "protected" mode. Application programs which used the extended address space of the microprocessor in the "protected" mode can only return to the "real" mode by resetting the microprocessor. The RESET of the microprocessor in the 80286 chip was accomplished by a feature which allowed the CPU RESET without upsetting the state of the rest of the machine. Upon RESET of the microprocessor the processor returned to the "real" mode.

The chip designers of the 80386 eliminated the processor's ability to recognize and respond to a "HOLD" request from external hardware even during the processor RESET. The HOLD state is used for system REFRESH of Dynamic Random Access Memory (DRAM) and for Direct Memory Access (DMA). Thus these operations, DRAM REFRESH and DMA, cannot occur during RESET of the 80386 processor. Since third party application programs were written with these processor features in mind (i.e., DRAM REFRESH and DMA), during processor reset, the 80386 microprocessor which eliminated these features was incompatible with pre-existing programs.

The arbitration circuit implemented in the preferred embodiment of the invention permits the DRAM REFRESH and DMA operations to properly operate during processor reset. Thus compatibility with third party software which implemented these features is assured with the 80386 microprocessor.

A dual mapping BIOS function is implemented in the preferred embodiment by using some of the high performance Random Access Memory (RAM) to hold the BIOS stored in ROM. Utilization of the RAM to store the BIOS improves the performance of the 80386 microprocessor since the microprocessor accesses a 32-bit memory (RAM) instead of the 16-bit memory (ROM). In prior art personal computers software (BIOS) has been contained in ROM connected to the microprocessor at the microprocessor's normal data size, i.e., 8-bit ROM for 8-bit processor such as the 8088 and two 8-bit ROMs for the 16-bit microprocessor such as the 8086 and 80286 processors. These 8 and 16-bit ROMs were fast enough in access time to meet the requirements of the prior art processors so the ROM's did not affect system performance to any degree.

With the development of the 32-bit 80386 microprocessor the standard 8 and 16-bit ROMs were too slow to keep up with the microprocessor. The addition of two more ROM devices (to achieve a 32-bit bus width) presents an undesirable cost penalty, however, a 16-bit ROM on a slower 16-bit bus materially affects the speed advantage of a 32-bit microprocessor.

Implementation of a dual mapped BIOS provides a 32-bit RAM memory for the BIOS at no significant cost penalty since the 16-bit ROMs are not replaced. Use of 32-bit RAM can be fully cost justified since the RAM subsystem necessary for a 32-bit processor required a minimum of 1024 kilobytes. Since a majority of the applications software can only utilize 640 kilobytes of RAM, 384 kilobytes of high performance RAM was available for use by the BIOS.

To achieve compatibility with prior art machines, the BIOS code has to remain at its original address and must be protected from an inadvertent write-over.

The dual mapped BIOS has been implemented in the preferred embodiment by adding decoding logic to the RAM subsystem to allow the system to respond to the ROM addresses. The decoding logic operates through a writable control port which switches the system from operation out of the 16-bit ROM to operation out of the RAM.

Implementation in the preferred embodiment is accomplished in the following sequence:
1) Computer power up;
2) Execution of BIOS stored in ROM begins;

3) Part of RAM system is tested;
4) BIOS copied from ROM to RAM which has been tested;
5) Control bit written by ROM code causing BIOS restored in RAM to continue start-up of machine;
6) BIOS stored in RAM is write protected;
7) Machine boot-up and continues operation out of RAM.

Turning now to the figures, and first to FIG. 1, there is shown a functional block diagram of a personal computer in accordance with the present invention. The personal computer is designed around the central processing unit (CPU) comprised of microprocessor (CPU) 20 and co-processor 21 (hereafter sometimes referred to as numeric processor). For the preferred embodiment of the present invention, microprocessor 20 is an Intel Corporation 80386 microprocessor and the numeric co-processor 21 is an Intel Corporation 80287 microprocessor. It is also possible to substitute the 80287 microprocessor with an Intel 80387 microprocessor when those microprocessors become commercially available.

Processor 20 and co-processor 21 are functionally connected to a 32-bit data bus 22. A 32-bit Random Access Memory (RAM) 23 is also connected to the 32-bit data bus. In order to permit the 32-bit processor 20 and co-processor 21 to function with the older generation products consisting of 8-bit and 16-bit input and output devices a bus controller 24 is provided between the 8/16-bit bus 25 and the 3-bit bus 22. The bus controller 24 re-structures data from 8-bit and 16-bit devices into a data string which can be accepted and used by the 32-bit devices attached to the 32-bit bus 22.

The bus controller 24 likewise re-formats the 32-bit data in a format which can be accepted and used by the 8 and 16-bit devices attached to the 8/16-bit bus 25.

As is further shown in FIG. 1, a 16-bit Read Only Memory (ROM) 26 is functionally connected to 8/16-bit bus 25. The ROM 26 is used to store the Basic Input-/Output System (BIOS). A copy of the BIOS is transferred to RAM after the computer power is turned on and a partial RAM system test is completed.

Also illustrated in FIG. 1 are the 8/16-bit input/output device ports which are functionally connected to the 8/16-bit bus 25. Data transferred from the 8 and 16 bit input/output devices to the 32-bit RAM 23 is restructured by the bus controller 24 before being stored in the 32-bit RAM.

Intel Corporation has published documentation for its 80386 and 80287 processors. This documentation is essential to an understanding of the operation of Intel's processors. Instruction sets and the information provided in Intel's manuals is presumed to be firmly understood by anyone attempting to practice this invention.

The preferred embodiment of personal computer which implements this invention contains at least the following hardware:
a) 80386 microprocessor;
b) 32 MHz clock for the 80386 microprocessor;
c) A 4 MHz or 8 MHz clock for a co-processor;
d) An 8 MHz expansion bus compatible with an 80286 processor;
e) A 4 MHz clock for the DMA subsystem
f) Random Access Memory;
g) Read Only Memory; and
h) Input/output device slots.

It is to be understood that the above listing of hardware requirements is not intended to limit the scope of the invention but rather to describe the preferred embodiment.

To provide a full and complete disclosure of the invention and to permit one skilled in the art to practice the invention, the mother board schematics of the preferred embodiment are attached hereto as Appendix A, a copy of which is available in the application file. The memory board schematics of the preferred embodiment are attached hereto as Appendix B, a copy of which is available in the application file. A bill of materials for the preferred embodiment of mother board schematics is attached hereto as Appendix C, a copy of which is available in the application file. A memory board bill of materials for the preferred embodiment is attached hereto as Appendix D, a copy of which is available in the application file.

The various clock rates referred to in the schematics are CLK 16, CLK 24 and OSC. The system clocks are separated into three sections. One is the CPU clock (32 MHz) for the 80386 and its associated circuits. Another is the 24 MHz clock which is used for the numeric co-processor. The third is the 14.31818 MHz clock which provides software compatible system timing functions, a fixed frequency signal on the expansion bus, and the 8042 keyboard processor clock reference.

The CLK 32 signal is clock for the 80386 processor (CPU). The CPU clock is provided by a crystal oscillator, CMOS buffer IC (74HC125), and an F74 flip-flop. There are three outputs from these circuits, a 32 MHz processor clock, a 16 MHz reference clock (CLK16*) (which has the same phase as the internal CPU clock), and a reset signal which meets the setup and hold time requirements for the 80386. The CPU reset is always adjusted to the 16 MHz clock so that the phase is properly matched to the CPU.

The 32 MHz clock and the CLK16* signal are provided to the 32-bit memory board for use in state machines synchronized in the CPU.

The signal BCLK is a (approximately) divide by two from CLK16*. This division takes place in the sub-state machine PAL D4-STAT where the clock is also re-synchronized to the CPU on each bus cycle. It is this adjusting that leads to the "approximately" part of the divide by two functions. The average frequency will be somewhat less than 8 MHz. Transitions of BCLK occur on rising edges of CLK16*.

The clock for the DMA subsystem is generated from the rising edge of the BCLK clock by toggling a 74LS74 flip-flop. The outputs (DCLK, DCLK*) will therefore have a frequency of one half that of BCLK.

The CLK 24 signal is the clock for the 80287 co-processor.

The clock source for the 80287 is developed from a 24 MHz crystal oscillator. The 24 MHz frequency (CLK 24) is divided down in single 74HC109 to provide either 12 MHz or 8 MHz for use by the numeric co-processor (80287). The 12 MHz frequency is divided again inside an 80287-3 to provide a 4 MHz operating frequency. The 8 MHz has the required 33% duty cycle for direct use by an 80287-8 giving an operating frequency of 8 MHz. The choice of frequencies is provided by switch SW1-3. Switch OFF selects 8 MHz (80287-8), switch ON selects 4 MHz (80287-3).

System bus compatibility is provided by clock rate OSC. The specific time dependent clocks in the system are generated by a crystal oscillator at a frequency of 14.31818 MHz which generates the signal OSC.

The OSC signal is provided to the system bus for compatibility with older generation computer products. The OSC signal is also divided by two by the PCLK flip-flop to provide a stable and unchanging frequency source (7.1591 MHz) to the keyboard processor (8042). The PCLK signal is in turn divided by six to provide a timing reference for the system timer (TIMCLK). This frequency is 1.19318 MHz and is compatible with the previous products for timing and speaker purposes.

The divide by six is done with a synchronous counter which cycles though the counts of 1 through 6 and back again. The counter is not specifically set on power-up but will always cycle into the legal count sequence within seven clocks.

The microprocessor addresses and data handling are generally handled in the manner set forth below. Typically the processor begins a bus cycle by placing an address and status on its bus. This address will usually come out even while the previous cycle is still in progress. Since most devices expect to see a valid address for the duration of a bus cycle, it is necessary to latch the address seen by the system bus. Some devices (notably high speed memory) are already short on time to perform their function therefore they overlap some of their operations with others, (i.e., address decode). To allow this, the system bus also provides a set of address lines LA<23:17> which are not latched but which can provide a greater setup time to perform decoding. The typical usage of these lines is address decoding whenever the address changes, and then latch the decoded outputs.

To provide the unlatched addresses, the board contains buffer ICs which are connected to the CPU's PA<23:17> address lines and provide LA<23:17> (see FIG. 8) as an output.

To provide the latched addresses, the board contains latched ICs which are connected the to CPU's PA<19:2> and provide SA<19:2> as an output. These latches are of the fallthrough type so that when the Address Latch Enable signal (ALE) goes active the address appears at the output. When ALE goes inactive, the addresses will stay on the outputs until the next bus cycle begins.

The address lines SA0 and SA1 are handled differently. The CPU indicates which bytes are to be accessed out of the 32-bit word by the status lines BE3* to BE0* or Bus Enable three through zero. The output of this state machine are the address lines SA0, SA1 and BHE*.

The signal BHE* is used on the system bus to indicate that the high half of the 16-bit data bus contains valid data.

These signals (SA0, SA1 and BHE*) are changed at the rising edge of ALE so that their timing is very similar to the other SA<19:2> address lines.

All of the address outputs listed above are disabled when the CPU responds to a HOLD request (BHLDA) so that another device can control the address bus. When this occurs, the address lines are fed back to the CPU bus (PA<23:2> and BE<3:0>) so that the 32-bit memory board can receive the address data from the other device. The feed back operation occurs from the SA<16:0> and the LA<23:17> lines through buffers and a PAL (D4-SADI) for SA0, SA1 and BHE*.

CPU address line PA20 is handled a little differently. Because of software compatibility considerations (with 8088 products) it is sometimes necessary to restrict program access to the bottom megabyte of memory. This is done by disconnecting the PA20 line from the bus and forcing a low in its place (by means of a 74F257). This is controlled by the line LOWA20 from the keyboard controller. To equalize the delay with the other address lines, the output of the 74F257 is used to directly drive the LA20 line instead of being buffered again by a 74LS245.

The CPU data bus is buffered from the rest of the system by four bi-directional buffer ICs and four latches. On the CPU side of the bus, the 80386 and 80287 are connected together. Four ICs buffer the separate bytes of the data bus. The latches are used to hold read data for the CPU during separate read cycles on the system bus when the CPU attempts to read more data than the system bus allows.

The data path also contains a bi-directional buffer between the high and low half of the bus to enable routing of the data from high half to low during high writes and routing of the data from low to high half during high reads of the 8-bit bus. This function is controlled by the CPYEN* and CPYHL* lines. CPYEN* enables the buffer, CPYHL* controls the direction according to the type of cycle (active for CPU writes or DMA reads).

The last item in the data path is a buffer for the processor board I/0 devices. This buffer is normally active in the "TO" direction to the I/O devices and switches to the "FROM" direction when an I/O read occurs to these devices (controlled by CIORD*). This buffer is disabled when DMA operations occur to allow the bus to be used by the DMA controllers for address latching.

Table I, attached hereto as Appendix E, a copy of which is available in the application file, illustrates the bus conversion from the CPU's BE<3:0> lines to the address lines and the data buffers that are enabled for each conversion.

Note that in Table 1 the "X8" term means that the system bus has indicated the cycle should be 8-bits. The BEx* lines are negative true bus enables from the CPU. The SA1 and SA0 lines are positive true and BHE* is negative true. The BENx* lines enable the data buffers to the bus and the latching function from the bus, they are negative true. The CPYEN* line enables the copy buffer from the SD<7:0> to SD<15:8>, the CPYHL* lines is also enabled when reading (high to low copy). The LAST CYCLE term is used to indicate the last cycle in a group of cycles from one CPU status, it tells the state machine to send the CPU the READY* signal.

The command cycles generated by the bus control logic are listed in Table II attached hereto as Appendix F, a copy of which is available in the application file. The number of 62.5 nsec clocks is listed for a no-wait state cycle, normal cycle, and one wait state cycle for each of the command types. Both the total cycle time and the command active (on) time are given. For cycles with more than one bus wait state, each wait state adds two additional 62.5 nsec clock cycles.

If the CPU status indicates more than one bus cycle will be required for a single CPU access, then the bus state machine will run the necessary number of bus cycles (duration indicted in Table II) to complete the CPU access. For example, if the CPU status indicates a double word memory read from the 8-bit bus, then the total cycles for the access would be 4*12=48, 62.5 nsec cycles (assuming normal cycles).

In the preferred embodiment the CPU is normally held in the NOT READY state. READY* only goes active (low) when a cycle is guaranteed to be finished. The CPU next address (NA*) line is normally inactive, requiring the logic to specifically tell the CPU when to send the next address.

The cycle begins when the 80386 activates ADS* and presents the status lines. The address is decoded by the 32-bit memory board (if present) and the signal M32* is produced. The system board decodes the status lines to determine if the cycle is a valid memory cycle, producing the signal MEM*. M32* and MEM* are then combined to the signal MEM32* which is latched by the rising edge of CLK32 (the CPU clock) at the beginning of phase one in the CPU cycle following ADS* going active. If the end result of this is NOT a valid 32-bit memory cycles, the signal MYCYC* goes active.

MYCYC* is then sampled by the D4-STAT PAL on the rising edge of CLK16* (the bus clock). Unless otherwise noted all clocks referred to are CLK16* clocks. When the PAL clocks in MYCYC* it generates the signal ALE*. The PAL code is set up to allow ALE* to be active only for a signal cycle. What follows next is the propagation of the ALE* pulse through a series of flip-flops arranged in a configurable shift register. The general method is to bypass parts of the shift register to shorten the total bus cycle time depending on the type of bus cycle to be executed.

The rising edge of ALE latches the address and status for later use and does the SA1, SA0, BHE* generation. This signal BCLK will be forced to a low during ALE by the D4-STAT PAL to insure the compatibility with previous products.

The next stage is T00. It is always generated. If the command being generated is a 16-bit memory command, as signified by LM-IO and M16*, then the signal CMD* will also be set active at this time. CMD* is combined with the decoded status to generate the signal MRDC* or MWTC*. If this is the last cycle in a set, (either guaranteed by the state or because the bus size is known by M16* and a memory cycle) then the D4-SADO PAL will set the signal CLSTD* active at this time.

The next stage is T01. It is always generated. If the command being generated is not a 16-bit memory command, as signified by LM-IO and M16*, then the signal CMD* will also be set active at time. CMD* is combined with the decoded status to generate the signal IORC*, IOWC* or INTA*. If this is the last cycle in a set, (because the bus size is known by IO16* and an I/O cycle) then the D4-SADO PAL will set the signal CLSTD* active at the time. If this is 16-bit memory cycle, and the NOWS* signal was received during T00 (LNOWS* active), then the signal BRDY* will be generated next to terminate the cycle and no other stages will be activated.

The next stage is T10. It is always generated. If the cycle is a 16-bit memory cycle, then the T40 stage will also be activated at this time. In this case, the T10 and T11 states will be ignored for the remainder of the 16-bit memory cycle.

The next stage is T11. It will always be generated. If the cycle is a 16-bit I/O cycle, then T41 will also occur at the same time as T11. If this is an 8-bit cycle, and the NOWS* signal was received earlier (LNOWS* active), then the signal BRDY* will be generated next to terminate the cycle and no other stages will be activated. Otherwise, stages T20, T21, T30 and T31 will follow if the cycle is an 8-bit bus cycle as signalled by CX16* inactive.

The next stage is T40. This stage is entered either from T31 during an 8-bit cycle, or T01 if a 16-bit memory cycle or a cycle that does not depend on the CX16* status occurs. This stage is skipped if the LNOWS* line is found active.

The next stage is T41. This is entered only from T40 (the normal case) or T10 (if a 16-bit I/O cycle is in progress). If the signal WAIT* is active at the end of T41, then T41 will be restarted, holding the bus in a wait state. Since the WAIT* signal is developed by sampling the BUSRDY* going high only every BCLK rising edge, wait states will come in increments of two clock cycles. When WAIT* goes inactive, the signal BRDY* will be generated to terminate the cycle.

At the same time as the cycle is being terminated (BRDY* is set active) several things can occur. If this is not the last cycle in the set (CLAST* inactive), then TS0* is set active by the D4-STAT PAL to start another cycle. If this is the last cycle in the set (CLAST* active) and another cycle is pending (MYCYC* is active), then TS0* is set active by the D4-STAT PAL to start another cycle. If no more cycles are to be run for the moment, then the bus state machine will remain idle waiting for another cycle.

TS0* is used to provide an adequate address setup between cycles in a group or between groups when the CPU pipelines the next cycle. After TS0* the ALE state will be entered for the next cycle.

The signal CMD* (which is used to enable on of MRDC*, MWTC*, IORC*, IOWC* or INTA*) is started at the beginning of T00 or T01 as discussed above. It will end at the end of the basic bus cycle (when BRDY* or TS0 goes active).

The signal WDEN* is used for enabling the various data buffers during write cycles. It goes active at the same time as ALE and goes inactive one cycle after CMD* goes inactive. In the case of back to back cycles, WDEN* will therefor remain active until after the last CMD*.

The signal BRDY* from the D4-STAT PAL signals the end of a set of bus cycles to the CPU. The signal CLSTD* (which goes active for one CLK16* cycle to indicate that the last cycle of a set is in progress) also generates the CLAST* signal internal to the D4-SADO PAL. CLAST* is used by the D4-SADO PAL to do the conversion from BE<3:0> to SA1, SA0 and BHE*. CLAST* is also used to tell the state machine that no more cycles are in the set. At the rising edge of ALE, CLAST* is set to the inactive state in preparation for the next CPU access.

The signal CLSTD* is also used to generate NAB* (next address from bus) which signals the CPU that it is all right to put a new address and status onto the CPU bus. Since NAB* is sampled at the beginning of phase two of a CPU clock cycles, it is synchronized to the rising edge of CLK32 at the rising edge of CLK16* by a F175 flip-flop. This assures a setup time to the CPU for NA*.

The signal CX16* is used to signal the presence of a 16-bit memory or I/O cycle. It is set active during T00 for memory cycles if M16* is active. It is also set active during T10 for I/O cycles if IO16* is active. It is set inactive at ALE in preparation for the next cycle. This signal is used to control the bus address conversion for the 8 or 16-bit bus and to adjust the timing of the expansion bus for 16-bit operations.

The signal LOE* (latch output enable) is generated during read cycles from the 8/16 bus to enable the data stored in the data latches to the CPU data bus. LOED* is first set active during ALE in the D4-SMSC PAL and is set inactive as soon as the signal BRDY* is active. LOED* is then clocked through to LOE* by the rising edge of CLK32 at the rising edge of CLK16* in a 74F175. When LOE* goes inactive, it buffers before the CPU may begin driving the bus again. The total delay to disable the latches is calculated in Table III attached hereto as Appendix G, a copy of which is available in the application file.

The BUSRDY signal is used to add additional wait signals to a bus cycle. If a 16-bit device wants to add an additional wait state, then it must pull the BUSRDY low (inactive) by the end of the third CLK16 cycle after the falling edge of ALE. To add only one wait state, BUSRDY must return to the high state during the fourth CLK16 cycle after the falling edge of ALE. If an 8-bit device wants to add an additional wait state, then it must pull the BUSRDY low (inactive) by the end of the ninth CLK16 cycle after the falling edge of ALE. To add only one wait state, BUSRDY must return to the high state during the tenth CLK16 cycle after the falling edge of ALE. The decode logic to drive BUSRDY should use the device address and MRDC*, MWTC*, IORC* or IOWC* as inputs. Synchronous peripherals usually use the falling edge of BCLK as the time to change the state of BUSRDY.

The NOWS* signal is used to shorten the standard bus cycle. If a 16-bit memory device is to prevent the standard wait state then it must pull the NOWS* line low (active) within one CLK16 time from the falling edge of ALE. (Note that this is not possible on 16-bit I/O cycles because it is not known that an I/O cycle exists until the required time). If an 8-bit device is to prevent the standard wait states then it must pull the NOWS* line low (active) within two CLK16 times from the falling edge of the command. The decode logic to drive NOWS* should use the device address and MRDC*, MWTC*, IOC* or IOWC* as inputs. If less than the four standard wait states normally used on 8-bit bus cycles is desired, then the NOWS* line can be used to provide 1, 2, or 3 wait states by delaying the activation of NOWS*. The NOWS* line is sampled at approximately the falling edge of BCLK.

The M16* signal is used to indicate that the current address on the LA<23:17> line is covered by a 16-bit memory peripheral. The system board will only use this signal if the current cycle is a memory cycle. The addressed peripheral on the bus must pull the M16* line low as soon as the address is decoded and hold it low until the address becomes invalid. The M16* line must be correct before ALE goes away to insure that it is latched by the system board latch. Pulling this line low prevents the 16-bit to 8-bit bus conversion logic from being activated.

The IO16* signal is used to indicate that the current address on the SA<9:0> lines is covered by a 16-bit I/O peripheral. The system board will only use this signal if the current cycle is an I/O cycle. The peripheral addressed on the bus must pull the IO16* line low as soon as the address is decoded and hold it low until the address becomes invalid. The IO16* line must be correct by the second CLK16 cycle after ALE goes away to insure that it is latched by the system board latch. Pulling this line low prevents the 16-bit to 8-bit bus conversion logic from being activated.

The signals SMRDC* and SMWTC* are used by the 8-bit bus only. These memory signals are only enabled when the lower one megabyte of memory is addressed. They are developed from the regular MRDC* and MWTC* signals by enabling a set of tri-state buffers with the signal LOWEN*. This signal is developed by the D4-SROM PAL from the address information on the system bus. The PAL also includes the latching function required to hold the address through the entire cycle and the refresh function for any dynamic memory on the original 8-bit bus.

The state sequences for typical machine cycles for the preferred embodiment are set forth in Table IV attached hereto as Appendix H, a copy of which is available in the application file.

The processor board of the preferred embodiment (also referred to as a mother board) contains logic to generate other types of bus cycles. A listing of other types of bus cycles is set forth in Table V attached hereto as Appendix I, a copy of which is available in the application file.

A description of the Input/Output (I/O) subsystems for the preferred embodiment is set forth in Appendix J which is attached hereto a copy of which is available in the application file.

A description of the interrupt controller subsystem and interrupts for the preferred embodiment are set forth in Appendix K which is attached hereto, a copy of which is available in the application file.

A description of the ROM memory system for the preferred embodiment is set forth in Appendix L which is attached hereto, a copy of which is available in the application file.

The following description for miscellaneous subsystems of the preferred embodiment are set forth in Appendix M, which are attached hereto, a copy of which is available in the application file.
1) Expansion bus definition;
2) Bus timing information for expansion bus;
3) 32-bit expansion bus definition;
4) Bus timing information for 32-bit expansion bus;
5) Page mode dynamic RAM board;
6) Address decoding;
7) Jumper setting;
8) Bits presented by option board;
9) Detailed cycle description; and
10) Timing analysis for page DRAM board.

Figure 2:
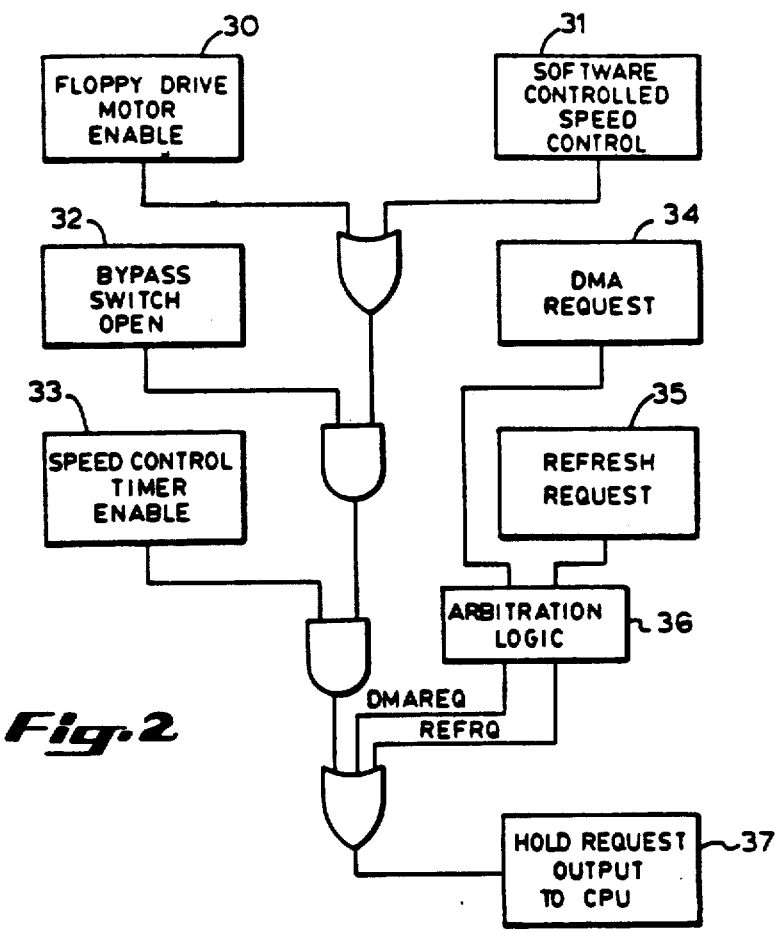
FIG. 2, is a simplified logic diagram illustrating the logic sequence employed in the microprocessor speed adjustment invention.

Turning now to FIG. 2 a simplified logic diagram illustrates the system components of the speed control device and the arbitration logic.

The Speed control of the microprocessor can be initiated by either the floppy drive motor spin-up or enable 30 or the speed control software 31. The computer operator interacts with the computer through a utility program to set the speed of the microprocessor. This action by an operator is represented in FIG. 2 by block 31.

As illustrated in FIG. 2 the floppy drive enable 30 is logically OR'ed with the software controlled speed control 31 and logically AND'ed with the speed control bypass switch 32. In the event the bypass switch 32 is closed the speed control mechanism is inoperative. The speed control command is then logically AND'ed with the speed control timer 33, therefore, the CPU HOLD output to the CPU remains active for as long as the timer remains active.

The speed control command is logically OR'ed with the arbitrated output of the arbitration logic of the DMA request 34 and the REFRESH request 35.

THE DMA request/REFRESH request is arbitrated by arbitrator logic 36 to prevent both a DMA and REFRESH request from occurring simultaneously.

The HOLD request 37 to the CPU can be generated by either the REFRESH request, DMA request or the speed control logic. As will be described infra these holds cannot occur simultaneously because of the logic which controls each function.

The speed control is initiated by the following four CPU instructions:
1) MOV AL, 92H
2) OUT 4BH, AL
3) MOV AL, XX
4) OUT 4AH, AL Instructions 1 and 2 above essentially disable the component 8254. "XX" in instruction 3 above is a number from 2 to 38 hex. The one-shot time delay set in the speed control timer is set by instruction 4. Address 4AH in instruction 4 above represents that timer 2 is to be set to the value in register AL. Address 4BH in instruction 2 is the control word register.

The speed adjustment software controls the setting of the one-shot timer. The source code listing of this utility program is set forth in Appendices N and O attached hereto, copies of which are available in the application file and incorporated by reference from U.S. Pat. No. 4,787,032, issued Nov. 22, 1988 as if set forth herein in full.

Utilizing the utility programs set forth in Appendices N and O the operator of the machine selects a time delay setting by selecting one of the arbitrary designations set forth below:

COMMON
FAST
HIGH or by selecting a speed setting from 1 to 50 where the setting "1" corresponds to the slowest machine speed which can be simulated by this microprocessor and "50" corresponds to the highest speed which can be simulated by this microprocessor.

It should be noted that the designation "COMMON" will simulate a microprocessor speed equivalent to an 80286 microprocessor operating at a 6 MHz clock rate; the designation "FAST" will simulate a microprocessor speed equivalent to an 80286 microprocessor operating at an 8 MHz clock rate; the designation "HIGH" will simulate the microprocessor speed of an 80386 microprocessor operating at the 16 MHz clock rate; full speed of an 80386 microprocessor.

The arbitrary speed designation of "3" on a scale of 1 to 50 corresponds to the simulated speed of an 8088 microprocessor and the arbitrary speed designation of "50" on a scale of 1 to 50 corresponds to the designation "HIGH" described above.

The KSUBS source code attached hereto as Appendix N sets the one-shot timer by setting register AL to the required hexidecimal value which corresponds to an operator's selection of either a value of "COMMON", "FAST" or "HIGH" or by an operator's selection of a decimal number in the range of 1–50.

The timer source code attached hereto as Appendix O sets the one-shot timer by setting register AL to a hexidecimal value corresponding to the "FAST" mode whenever the floppy drive motor is enabled. Enabling the floppy drive motor reduces the apparent microprocessor speed since most floppy drive operations indicate either a transfer of data from a copy-protected diskette or other diskette operation which cannot be performed at the full 80386 processor speed.

Figure 3:
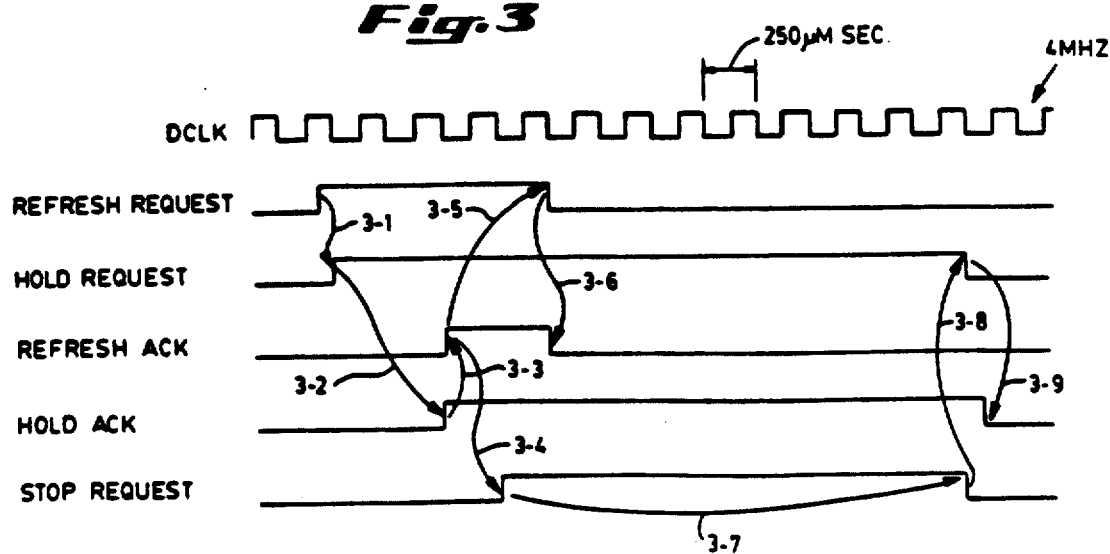
FIG. 3 is a timing diagram for various signals of the microprocessor speed control logic and the HOLD request and RESET, request signals which occur during different cycle operations.
Figure 4:
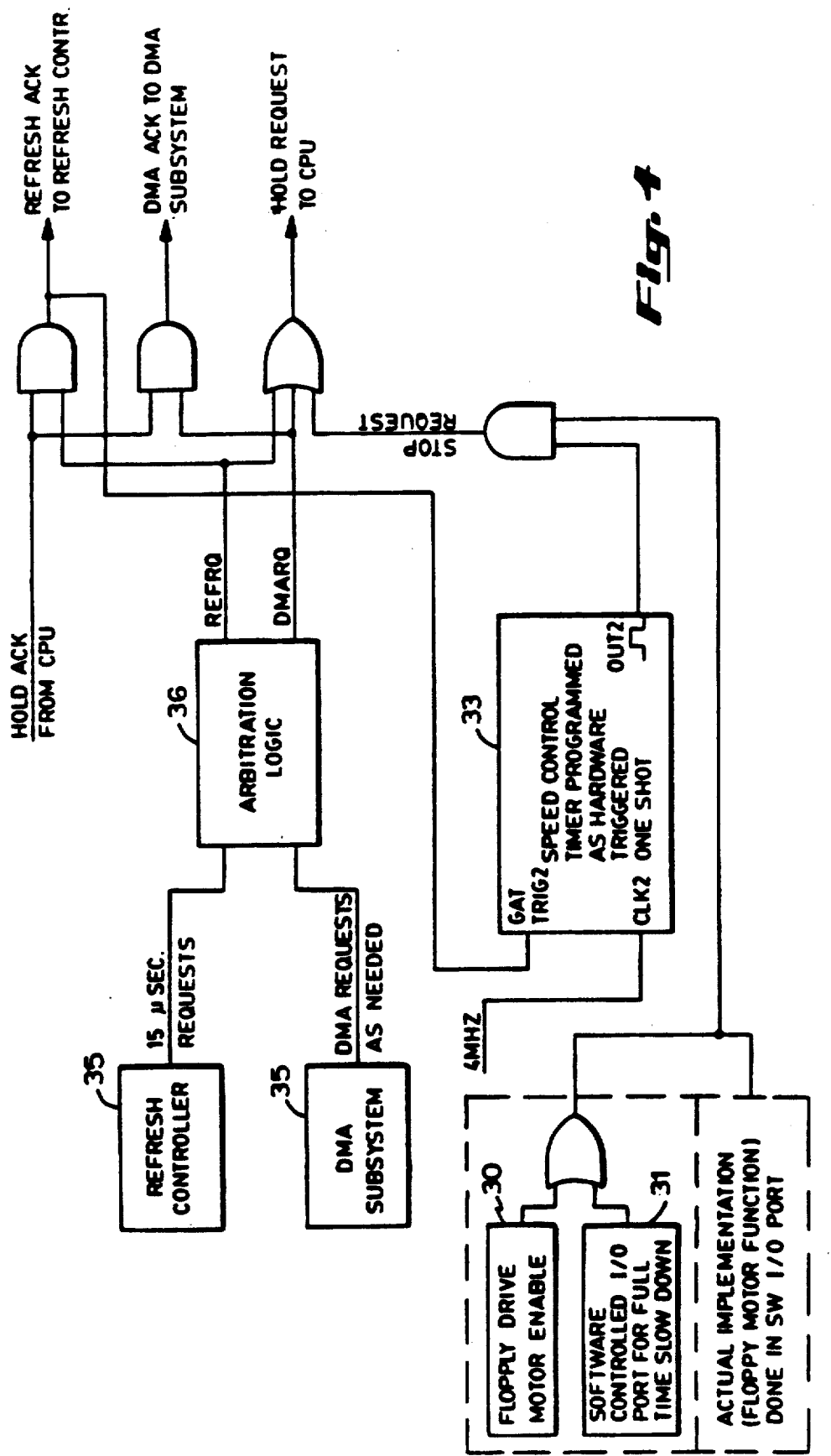
FIG. 4 is a simplified schematic illustrating the basic logic steps employed to implement the microprocessor speed control.

Turning now to FIG. 3 and FIG. 4 the following sequence is illustrated in FIG. 3 (timing diagram) (the numbers in the description below corresponding to the numbers on the timing arrows shown in FIG. 3):

A 4 MHz clock rate is illustrated as "DCLK". Each square wave represents 250 microseconds.

3-1: The REFRESH request occurs once every 15 microseconds. This request is arbitrated with the Direct Memory Access (DMA) request to prevent simultaneous requests. The REFRESH request is then logically OR'ed with the other request sources to generate the CPU "HOLD" request.

3-2: Sometime after the HOLD request is generated and after the current CPU bus cycles have been completed (approximately 215 nanoseconds to 12 microseconds later) the CPU will stop executing the program and grant the HOLD acknowledge (ACK).

3-3: The HOLD ACK is logically gated with the arbitrated REFRESH request to form the REFRESH acknowledge (ACK) signal to the REFRESH controller.

3-4: The REFRESH ACK signal triggers the digital one-shot (Intel 8254 or similar logic device) which in turn sets the STOP request signal active. Since the REFRESH request is still present (high), there is no change in the CPU state.

3-5: The REFRESH controller executes the REFRESH cycle on the system bus and then releases the REFRESH request. This typically takes approximately 500 nanoseconds.

3-6: Release of the REFRESH request also releases the REFRESH ACK signal and ends the REFRESH portion of the cycle. (If the STOP request is NOT present, then the HOLD request is released and the CPU begins executing again.

3-7: During the duration of the one-shot timeout, the STOP request remains active and the CPU cannot run bus cycles (i.e., execute code). This timeout value is variable from 0 duration (e.g., CPU begins executing immediately after REFRESH, equivalent to full speed microprocessor cycle) through 15 microseconds where the CPU never gets a chance to execute because another REFRESH and STOP cycle will begin as soon as the last cycle is completed (e.g., microprocessor fully stopped). Choosing values between 0 and 15 microseconds will result in apparent speed changes of the CPU from full speed to the speed of previous generation microprocessors. If the time delay value for the one-shot timer is less than 15 microseconds the STOP request will be dropped when the one-shot times out.

3-8: Release of the STOP request causes the HOLD request to be dropped.

3-9: The CPU responds the HOLD ACK. The CPU begins executing the program again (i.e., executing code or program steps).

3-10: 15 microseconds from the original REFRESH request, the next REFRESH request will arrive and the cycle will repeat itself.

The DMA (Direct Memory subsystem is not impeded from normal operation during the time the CPU is stopped to permit the simulation of a slower CPU. Devices using the DMA subsystem are therefore independent of the simulated speed of the CPU.

The use of the microprocessor HOLD or STOP permits time dependent operations to be handled by the 32-bit microprocessor which is operating at a constant clock rate, in this case 16 MHz, without slowing the microprocessor down to a slower clock rate. The use of a slower clock rate has been previously suggested however this method of operating is not acceptable in an 80386 environment because it has the effect of slowing down all operations, not just those which are time dependent. Thus in the typical application the microprocessor is placed on HOLD only for so long as necessary to simulate the microprocessor speed which is selected by an operator or the speed which is necessary to perform time dependent functions.

Alternatively, the operation of the microprocessor can be placed in a deliberately slow mode by causing the one-shot timer to be re-initiated as soon as it is released. This is accomplished in software and is initiated by the operator calling up a "Mode Speed" subroutine. The "Mode Speed" source code is provided in Appendix N as "KSUBS". Once the subroutine is called up the operator selects a speed ranging from 1 to 50, or in the alternative specific speed designations which have been arbitrarily set. In this case the following speeds have been arbitrarily set which correspond to the speeds indicated below:

COMMON - Approximately equivalent to a speed setting of an 80286 microprocessor operating at clock rate of 6 MHz FAST - Approximately equivalent to a speed setting of an 80286 microprocessor operating at a clock rate of 8 MHz HIGH - Approximately equivalent to a speed setting of an 80386 microprocessor operating at a clock rate of 16 MHz the manual setting of the speed as described above permits the operator of the computer to play time dependent games and also to execute time dependent programs without losing the benefit of having a 32-bit microprocessor operating at a clock rate of 16 MHz.

EXAMPLE 1

The following example illustrates the approximate microprocessor speed which is simulated when the one-shot timer time delay is set at 2 microseconds:

$$\frac{1 - \frac{(0.5 + 2)}{15}}{1 - \frac{0.5}{15}} = 86\%$$

where the denominator of the above equation sets forth the normal system speed with the microprocessor operating at full system speed, i.e., the 16 MHz clock rate, and the numerator of the above equation is the effect of the slow-down on the system speed.

In the above equation normal system speed is designated by unity and the two microsecond one-shot timer setting is entered in the numerator of the equation.

The system speed which is simulated is 86% of the full 80386 microprocessor operating at the 16 MHz clock rate.

Referring now to FIG. 4 a simplified schematic of the arbitration logic and speed control logic is illustrated. The CPU HOLD request can be generated by either the arbitrated REFRESH request, the arbitrated DMA system request or the system speed control.

The system speed control is initiated by software and occurs by either a manually initiated speed selection 31 or by operation of the floppy diskette drive 30.

As illustrated in FIG. 4 the speed control is logically AND'ed with the one-shot to generate the CPU HOLD. The implementation of the one-shot provides the time delay necessary to stop the CPU for a specified time to "simulate" a microprocessor speed below that which corresponds to an 80386 microprocessor. The longer the time delay of the one-shot the slower the CPU "appears" to operate. The CPU speed is not reduced but rather only "appears to be reduced" since the CPU clock rate is not reduced but rather the CPU is stopped and started thereby generating an average CPU time which "appears" to be slower.

Figure 5A:
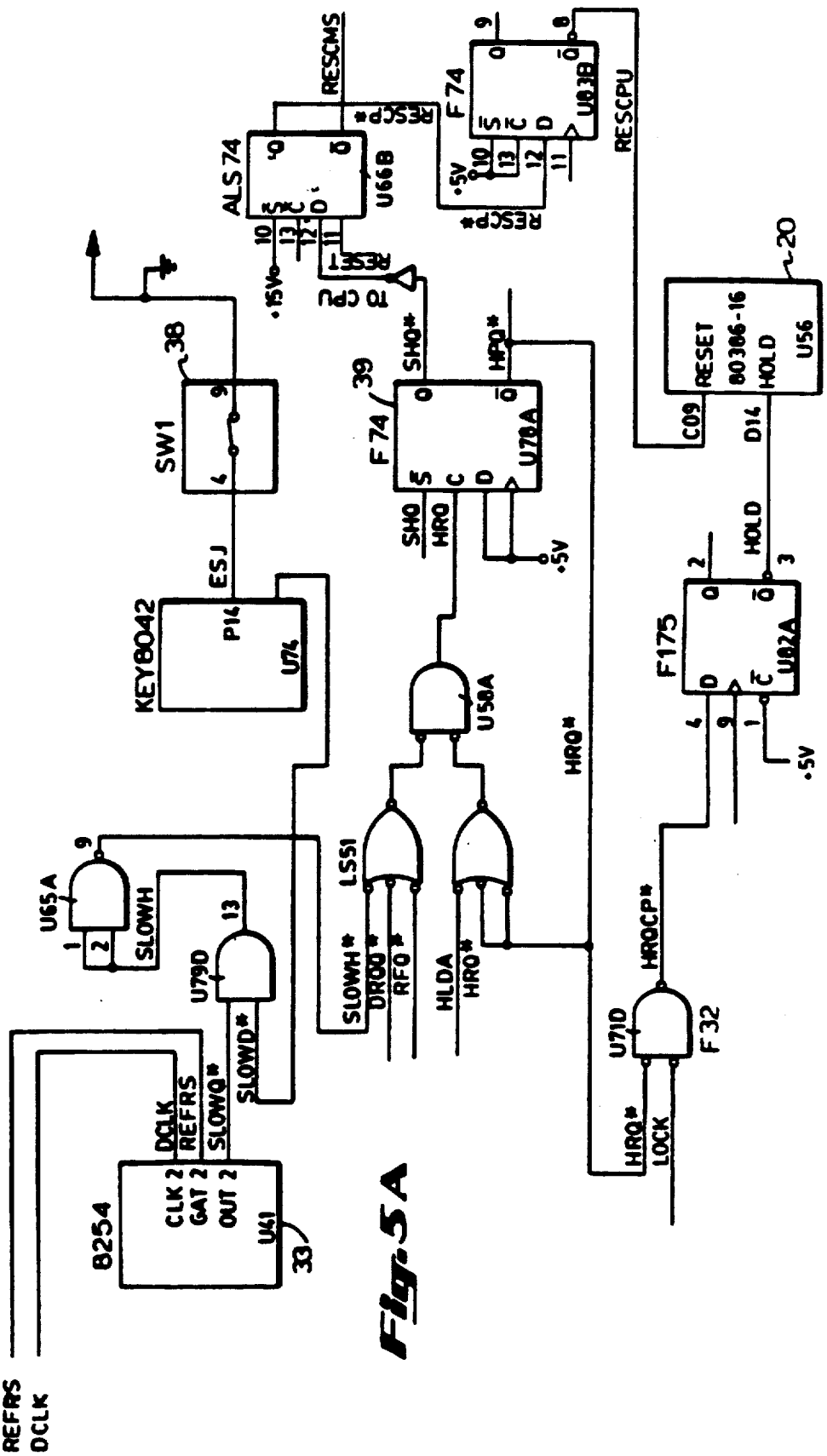
FIGS. 5A and 5B comprise detailed partial circuit diagrams of a portion of the schematics.

Referring now to FIG. 5A the one-shot timer 33 is represented by device U41. The output of device U41, SLOWQ* is logically AND'ed with SLOWD* at device U79D and inverted by device U65A to produce the SLOWH* output.

The by-pass around the automatic speed control is provided by switch 38 designated as SW1 in FIG. 5A. With switch 38 open the automatic speed control is enabled whenever the floppy drive is activated. Conversely with switch 38 closed the automatic speed control is bypassed.

FIG. 5A also illustrates flip-flop 39 also designated as device U78A. Flip-flop 39 serves as the arbitration logic for the DMA request and the REFRESH request. The flip-flop 39 also provides the CPU HOLD request to the CPU 20 for the speed control function.

Figure 5B:
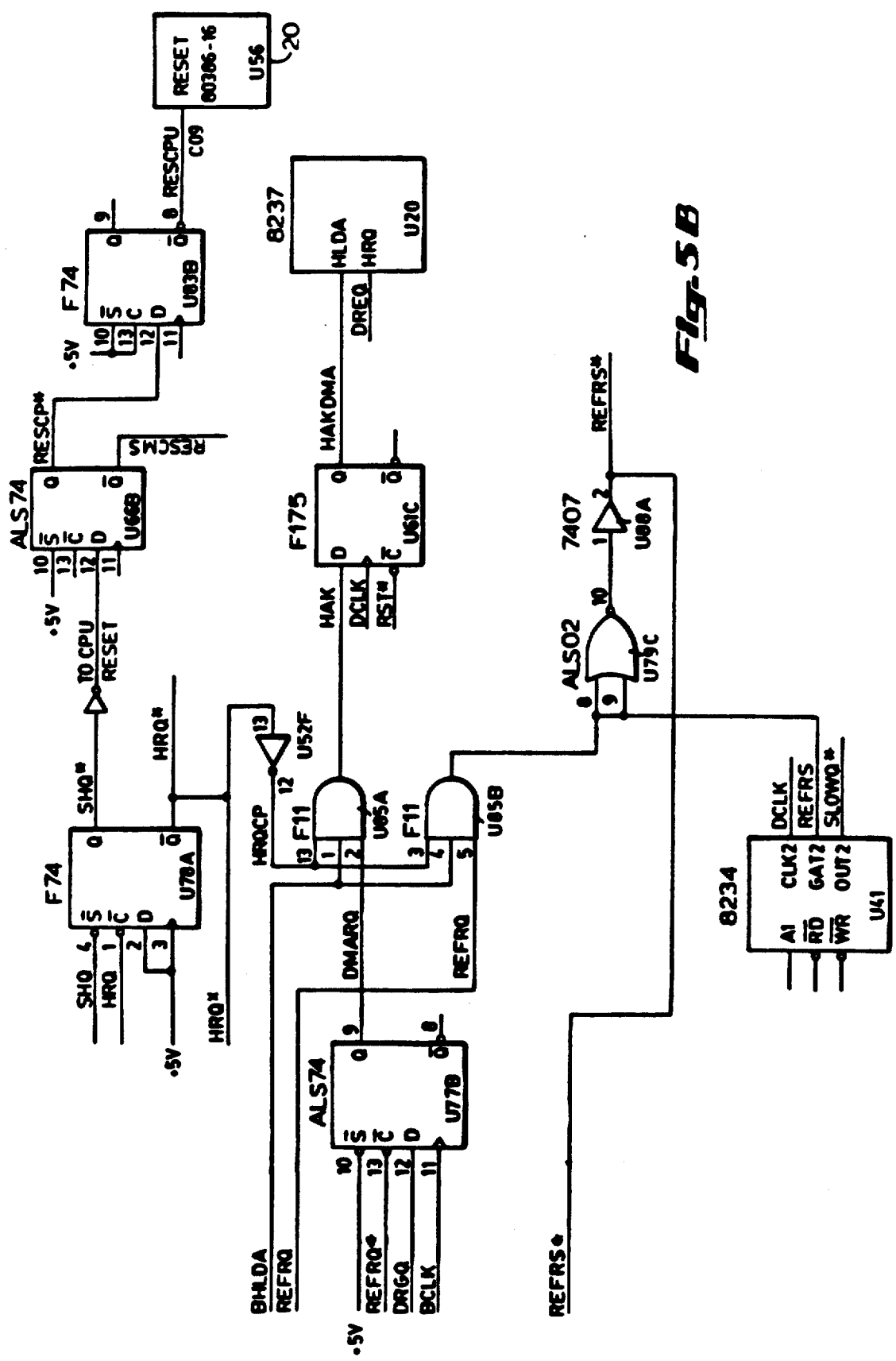
Figure 6:
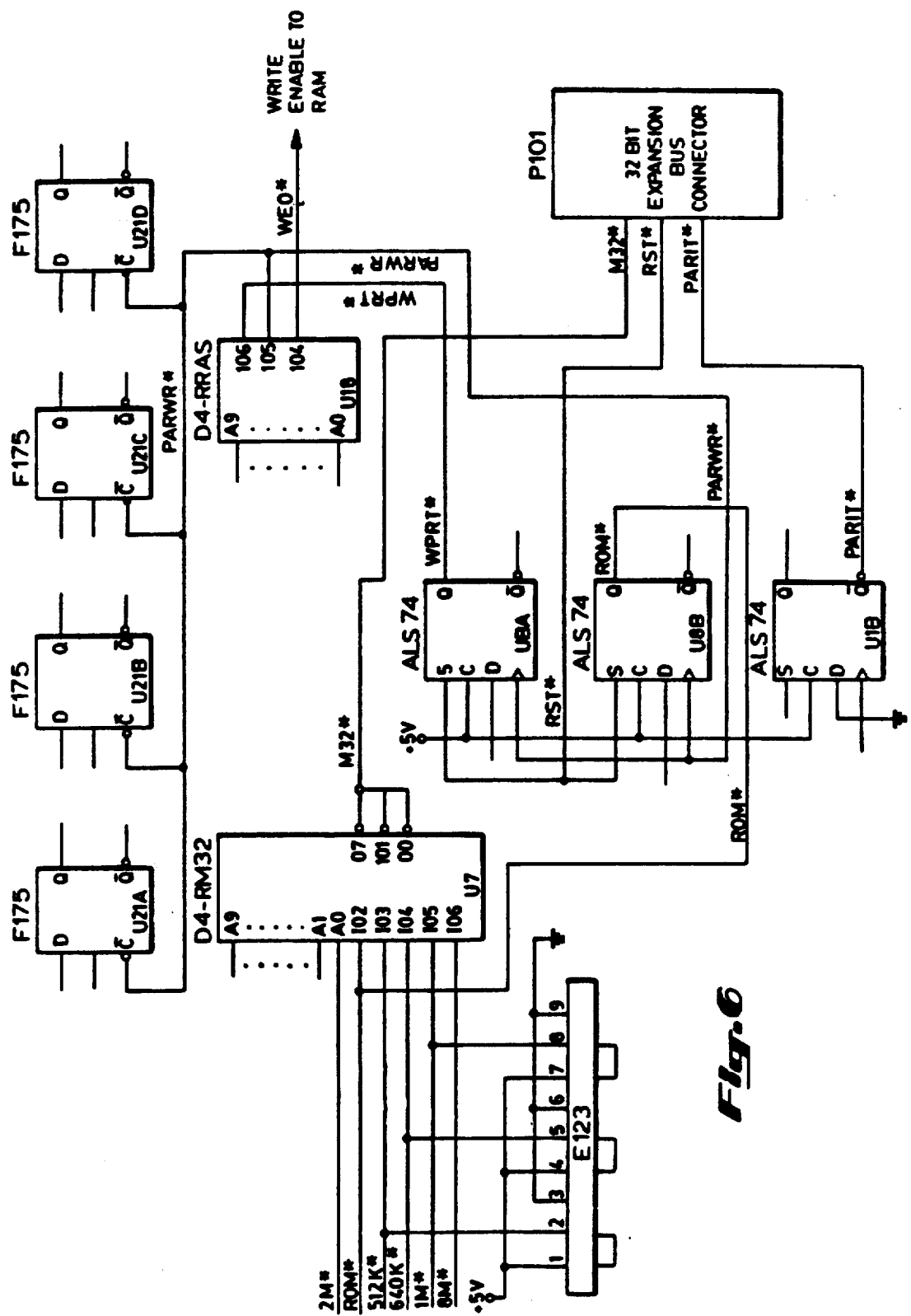
FIG. 6 comprises a detailed partial circuit diagram of a portion of the DRAM memory board schematics.

Referring now to FIG. 5B the functional schematic for the RESET/HOLD arbitration logic is illustrated. The arbitration circuit operates on the HOLD and RESET signals to prevent them from occurring at the same time. The arbitration circuit causes a RESET signal to wait until after any pending HOLD is serviced or causes a HOLD signal to wait until after the RESET is complete. The arbitration circuit holds the last signal received until the first signal received is complete.

The preferred embodiment of the invention is illustrated in the drawings attached hereto as Appendices A and B. In this embodiment the speed control system is implemented to give the user some control of the system speeds in the event that software is speed dependent. The system consists of one channel of the second 8254 timer counter and an interconnect to the HOLD request circuit. The timer channel is programmed as a one-shot which is triggered by REFRESH requests. If the 8042 keyboard controller SLOWD* line is active (LOW) then the timer output will extend the CPU HOLD time for REFRESH by the programmed value of the one-shot. During this HOLD time, the CPU cannot use the bus for execution, but the DMA subsystem can continue to work. The time is clocked by DCLK giving a 250 nanosecond increment in bus HOLD time. To disable the circuit, the 8042 SLOWD* output can be set inactive (HIGH) or the 8254 timer can be stopped by programming the counter but not giving it a count value.

In order to minimize the potential for operator error because of a failure to set the speed at the proper rate for floppy diskette operations, the computer software is specifically written to sense the operation of the floppy diskette motor. In actuality the software detects a call to the diskette motor or drive and initializes the one-shot timer by setting the one-shot timer time delay. This in effect slows the operation of the computer to a rate equivalent of COMMON. Any calls to the diskette for information which is to be transferred at the 16-bit rate will result in an automatic slow-down of the microprocessor, not by slowing down the clock rate as previously done in prior art devices but by initializing the one-shot timer described above and thus placing the microprocessor on HOLD. This has the net effect of holding up execution of any bus cycles for a pre-determined period of time.

Once the transfer of data is completed the HOLD is released and the microprocessor resumes it operation and execution of bus cycles. The completion of data transfer is sensed by the software by monitoring the floppy diskette drive motor—thus after the diskette drive motor is stopped the initialization of the one-shot timer is halted and the microprocessor resumes unimpeded operation.

It has been found that copy-protected diskettes are very sensitive to the execution speed of the microprocessor primarily because the copy-protection scheme is expecting a particular timing rate. Thus as software written for an older generation machine is adapted for a faster new generation machine it becomes difficult to use the copy-protected software in the new generation machine because the software which was written to execute in a slower machine is expecting a particular execution rate which was determined by the slower clock rate. It has been found that the copy-protected software written for older, slower machines cannot be executed in newer, faster machines because of the faster clock rates. In the present invention the utilization of the one-shot timer to stop execution of the microprocessor by placing it in the HOLD or STOP state permits the older software written for the slower machines to be utilized in this new machine without slowing the clock rate down to that of the older generation machines. Thus the new generation machine which is operating at a clock rate of 16 MHz and a 32-bit rate achieves compatibility with older software which heretofore had not been compatible with a new generation machines.

The ability of a new machine to adapt to older generation software has added advantages in that there is no need for the prospective customer of the computer to wait for application programs to be written for the new machine by third party programmers writing with the new clock rate in mind. Thus a 32-bit machine operating at 16 MHz has the potential to gain ready acceptance from future users because it is fully compatible with software programs previously used by the prospective customers in the older generation machines.

The utility program which can be executed by the operator of the machine to slow down the machine has the added advantage that it will permit the operator to vary the program speed not by changing the microprocessor clock rate but by varying the time delay of the one-shot timer. This advantage is manifested in the ability of the operator to manually and intentionally vary the speed of the machine in the event that he wants the machine to function as an older generation machine.

A switch SW1 also provided as is illustrated in FIG. 5A which permits the operator to manually select a bypass mechanism. This switch will defeat the automatic slow-down of the machine. Thus the software which is written to slow-down the operation of the machine by sensing the operation of the floppy diskette drive is defeated.

As previously described the operation of the machine can be manually set to operate at a rate much slower that the rate achieved with a 16 MHz clock rate by selecting the one-shot timer to a time delay which simulates the operation of a slower machine, i.e., an 8088 or 8086 microprocessor or an 80286 microprocessor. A source code listing is provided and is fully set forth in the Appendix H.

The source code of the software listing is provided in Appendix O for the subroutine which is executed to automatically set the speed of the machine. This automatic feature automatically detects the operation of he floppy diskette motor and sets the speed of the one-shot timer to a simulate the speed of an 80286 microprocessor operating at a clock rate of 6 MHz.

An excerpt of the schematic necessary to implement this invention is set forth in FIG. 5A and 5B, however, the entire operational schematics of the preferred embodiment are set forth in Appendices A and B. It is to be understood that the schematics merely set forth the preferred embodiment of the invention and that further implementations of this invention may be made by one skilled in the art.

It is to be further understood that the software listings set forth in Appendices N and O are merely illustrations of the one embodiment of the invention and that further embodiments may be realized and implemented by one skilled in the art.

To assist in the interpretation of the schematics attached hereto as Appendices A and B, a bill of materials of the components used in the preferred embodiment are attached hereto as Appendices C and D. Again it is to be understood that the components set forth in these Appendices are merely the components used in implementing the preferred embodiment.

A simplified logic diagram is set forth in FIG. 4. The simplified logic diagram illustrates the logic flow of each of the components necessary to implement the preferred embodiment. It is to be understood that the implementation of the preferred embodiment may be accomplished in a manner other than that specifically illustrated in FIG. 4 by those skilled in the art. The auto-speed routine is executed by calling up the speed-mode routine which is set forth in Appendix N. The routine is executed by utilizing the following command "Mode Speed". Upon execution of this command the routine is automatically loaded and thereafter the operator causes the program to execute by entering a number from 1 to 50 or one of the following commands: COMMON, SLOW or FAST.

As previously indicated the utilization of one of the word commands above results in the assignment of a speed destination by the software. Upon assignment of the assigned speed setting the software causes the entry of the specified speed assignment into the one-shot timer. Consequently, a corresponding time delay is assigned to the one-shot timer thereby causing a corresponding time delay and HOLD of the execution of microprocessor bus cycles.

As previously indicated the 80386 microprocessor is intended to replace the 80286, 8088 and 8086 microprocessors manufactured by Intel. It has been determined that the 80386 microprocessor lacks some of the previous features, features which were specifically implemented in the 80286 microprocessor while at the same time implementing new features which were specifically designed to speed up the microprocessor and vest the new microprocessor with more enhanced features.

One of the features which was eliminated from the 80386 microprocessor is the ability to respond to HOLD request during RESET which in the 80286 microprocessor was intended to permit the operator to reset the microprocessor without affecting other systems of the computer. The ability to reset the microprocessor is an important feature in that at times the microprocessor must be reset without upsetting the setting of other key registers and memory. Typically key registers and memory are reset during either a cold or warm boot of the system, however, the registers and memory should not be reset whenever the microprocessor is reset since this will result in a loss of data and information in the registers and memory.

The drawbacks of the 80386 microprocessor were realized in the implementation of the Direct Memory Access (DMA) and the microprocessor REFRESH cycle. In order to prevent the loss of data during a DMA transfer request or REFRESH which could occur when an 80386 microprocessor is executing a RESET command, it was necessary to utilize an arbitration circuit to arbitrate the execution of the DMA or REFRESH cycle, and the execution of a microprocessor RESET cycle. The arbitration circuit is set forth in FIG. 7 and also illustrated in FIG. 5A as device U78A.

Figure 7:
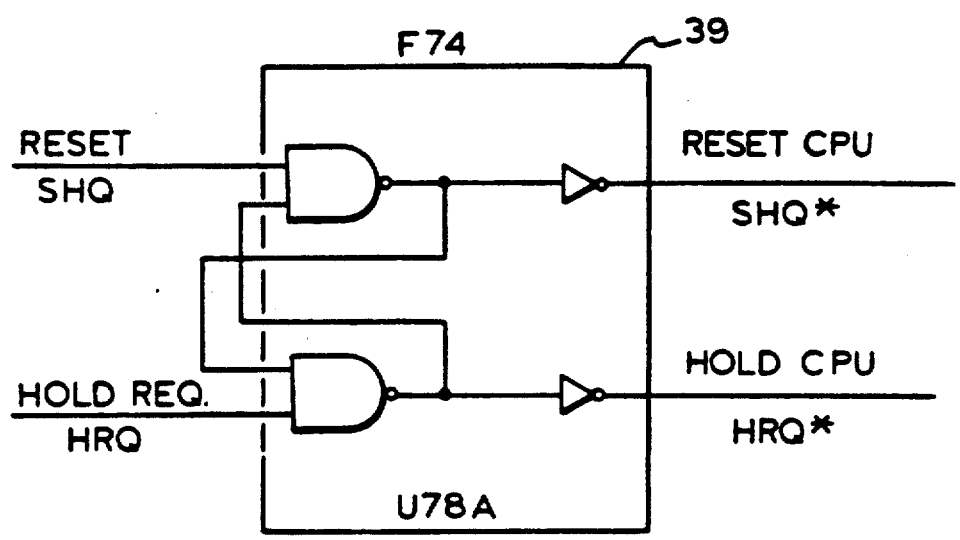
FIG. 7 is a simplified flow diagram of the HOLD/RESET arbitration logic.

The implementation set forth in FIG. 7 is only one implementation of the invention herein. Other implementations may be realized by those skilled in the art having the benefit of this disclosure. The arbitration circuit is primarily executed in hardware, however, it should be apparent to one skilled in the art that implementations of this invention can be made with software.

It should be further realized that the implementation of the arbitration circuit does not accomplish the same function previously implemented in older generation microprocessors. Older generation microprocessors did not arbitrate the microprocessor RESET cycle with the HOLD but rather processed both RESET and HOLD at the same time.

In the present invention the Dynamic RAM REFRESH and DMA controller are arbitrated to prevent these signals from occurring simultaneously and to retain the last signal received while the first signal received is processed. The Dynamic RAM REFRESH subsystem is designed to do a memory read cycle on each of 256 addresses in the memory space. The system is also capable of being driven by an external source if another bus master has control. The system consists of a timer (part of the 8254) which generates the REFRESH requests over 15.924 microseconds, arbitration logic which arbitrates whether the REFRESH controller or the DMA subsystem secures the bus, a timing generator, and a REFRESH address counter. The REFRESH request rate of 62.799 KHz provides 128 REFRESH cycles in 2.038 milliseconds or 256 cycles in 4.0764 milliseconds.

The REFRESH cycle starts when the REFCK out of the 8254 goes high. This clocks the RFK flip-flop high. The RFK flip-flop will remain high until the REFRESH request is satisfied. This line goes to the HOLD request arbitration circuit discussed above. Nothing else happens until the arbitration circuit responds with acknowledge signal REFRS*. (Note: to allow bus masters control of REFRESH, the REFRS* driver is an open collector gate with a pullup resistor).

When REFRS* goes active, it will be clocked into REFEN* flip-flop by the BCLK signal, enabling the REFRESH address from the counter onto the bus. The REFEN* signal is in turn clocked into REFRD* flip-flop by the next rising edge of BCLK, enabling the MRDC* command onto the bus. The REFRD* signal is gated with BUSRDY and clocked into the next flip-flop (REFEND) by BCLK. This allows a slow memory board to insert wait states into REFRESH cycles. The output of this flip-flop (REFEND) is gated with the REFRS* signal to end the REFRESH cycle on the next BCLK. At the same time that REFEND signal is clocked through, the REFCL* flip-flop is clocked to a low, clearing the RFK and RFQ flip-flops and ending the REFRESH cycle.

If an external bus master wishes to take the bus for long periods of time, it must perform REFRESH or risk losing the dynamic memory. The external bus master can do this by developing its own REFRESH request timer and internal arbitration. When it is not otherwise driving the bus, but still has bus control, it can do a REFRESH cycle by pulling the REFRS* line low with an open collector gate. When the MRDC* line goes inactive from the REFRESH cycle, the REFRS* line should be released. The external bus master can then take full control.

The RFK (REFRESH request) signal is synchronized to DCLK* by RFQ flip-flop. Another flip-flop synchronizes the DREQ (DMA request) signal from the DMA subsystem to the DCLK clock, This insures that the two requests cannot arrive simultaneously. Both requests are next clocked by a pair of flip-flops (DMARQ, REFRQ) that have their Q* outputs cross connected to the other's clear inputs. This guarantees that only one of the two signals (DMARQ, REFRQ) can be active at a time.

The two request signals are also OR'ed together and run through a circuit which locks out the combined request when a HOLD acknowledge cycle is in progress but the original request has gone away. This prevents a new HOLD request from being initiated before the last one is completed. The output of the speed control circuit is also OR'ed in with the other requests in order to use up CPU bus bandwidth as a means of slowing the system down.

The (HRQ) output is fed to an F74 flip-flop which acts as another arbitration circuit. This circuit prevents processor reset from occurring during HRQ or HRQ from occurring during processor reset. This prevents the CPU from aborting a HOLD request with a subsequent lost or erroneous HOLD cycles.

After the reset arbitration, the output (HRQ*) is gated with the signal LOCK. This signal is driven from the processor LOCK* signal. The processor LOCK* is used to clear a flip-flop to set the LOCK signal active. The flip-flop output goes inactive on the falling edge of the next CPU READY* line, thus holding LOCK active for one CPU bus cycle longer than originally intended. The purpose of holding off HRQ until the new LOCK goes away is to fix any processing bug or error encountered by the 80386 CPU.

The output signal from the LOCK lockout circuit (HRQCP*) is synchronized to the CPU clock by a 74F175 (HOLD) to assure a proper setup time to the CPU. The CPU is set out in the following table:

| CLK16* cycle time | 62.5 |
| --- | --- |

| -continued | |
| --- | --- |
| CLK32 to CKP16* in F32 | −5.6 |
| CKP16* to HOLD in F175 | −9.5 |
| 386 HOLD setup time | −25.0 |
| MARGIN ********** | +22.4 |

When the HLDA signal is received from the CPU indicating that the bus is available, then the signal REFRS* (gated from REFRQ) or HAKDMA (gated from DMARQ) is set active, enabling the appropriate subsystem. If the speed control circuit is the source of the request, then neither of the above is set active.

It should be noted that if a cycle is in progress from one requestor, and the other requestor makes a request, then on the first rising edge of BCLK after the first xxxREQ (i.e., DMAREQ or REFREQ) signal goes away, the second requestor will be acknowledged. This will occur without giving the bus back to the CPU, i.e., a DMA HOLD and a REFRESH HOLD will be run back to back. If the speed control circuit is holding the bus then holds from DMA or REFRESH will be immediately acknowledged.

When the HLDA signal is received from the CPU, the address latches and is tri-stated. The CPU bus command generator PAL (D4-SCMD) command output signals are also tri-stated. The command signals are held inactive by pullup resistors until the DMA controller, REFRESH controller, or other bus master can take over the bus. The Bus Address Latch Enable signal (BALE) is forced to the active state requiring that any other bus mast must hold an address stable for the duration of a bus cycle.

To allow the 32-bit memory board to receive addresses generated by the other subsystems, a series of buffers back feeds the CPU address bus from the system buses.

The data buffers between the CPU and system bus are turned around to work in the opposite direction from normal so that the other bus master can access the 32-bit memory as if it was a 16-bit memory.

The DMA controllers in the system operate as a separate subsystem from the main bus controller. They handle requests from the DMA peripherals, arbitrate between them, and then request access to the system address and command busses from the CPU by asserting DREQ. The system consists of two controller ICs (8237A-5), a page register for handling the high order bits of DMA address (74LS612), and various latches and logic for address routing and control.

There are two types of DMA in the preferred embodiment, byte and word DMA. One of the controllers is connected to handle byte operations, the other, word operations. In order to simplify the arbitration between sources, the HOLD request line from the byte controller is connected to a DMA request line (DRQ4) on the word controller. The word controller is programmed for cascade mode on channel 0 (to which is connected DRQ4) so that it will not actually place an address on the bus when it acknowledges the byte controllers request.

The DMA byte cycle begins when a peripheral sets a DRQ0-DRQ3 line active. The 8237 then arbitrate other pending requests and sets the HOLD request output active. This line (DRQ4) is connected to the word controller as discussed above which does its arbitration. The word controller then sets its HOLD request line active (DREQ) which is then synchronized and arbitrated by the HOLD arbitration logic discussed above.

When the system responds to the DREQ with a HAKDMA, the word 8237 will respond with a DAK4 which acts as a HOLD acknowledge to the byte controller.

The D4-SCPY PAL drives the SBHEI line in the opposite sense of SA0 in order to satisfy 16-bit devices on the bus.

The DAEN1* signal is OR'ed with the DAEN2* signal inside the D4-SCPY PAL to produce DAEN* which changes the direction of the bi-directional buffers so that the DMA address will be on the system bus.

THE SA16 line has an additional tri-state buffer. This buffer is enabled for byte type DMA and disabled for word type DMA (because the work 8237 dries SA16 in word DMA).

The selection of which internal register is to be enabled to the bus is done by three gates which encode the DAKx signals into a register address for LS612.

In the above fashion, all of the address lines on the bus are driven with appropriate data. When this is complete, 8237 drives the lines XIORC*, XIOWC*, XMWTC* and DMRDC* according to the type of cycle being run. The first three of these lines are buffered back to the IORC*, IOWC*, MWTC* lines by a bi-directional buffer controlled by DAEN*. The DMRDC* line is handled differently. It is delayed by one DCLK cycle before being gated onto the XMRDC* line and then to the MRDC* line. When DMRDC* goes inactive, XMRDC* goes inactive without the DCLK delay. This action provides a greater memory address set up on read commands for block transfer modes of the 8237.

A single DCLK length wait state is added to all DMA cycles. To do this, the OR of DMRDC* and XIORC* clocks the DWQ flip-flop to inactive, setting DRDY inactive. On the next rising edge of DCLK the DXQ flip-flop is clocked active which in turn sets the DWQ flip-flop active again. On the next DCLK, DXQ will go inactive, allowing DRDY to go active and signal ready to 8237. If a peripheral wants additional wait states, it can pull the BUSRDY line low which will set the DWQ output to a low and prevent DXQ from going inactive. The wait circuit is prevented from being affected by BUSRDY except during DMA cycles by a gate which holds the DWQ flip-flop set active.

The D4-SCPY PAL enables the COPYEN* line if SA0 is high and the addressed memory is 16-bit in order to route the data between the low half and high half of the data bus. The COPYHL line moves the data from high to low on memory reads, and from low to high on memory writes.

Word DMA operations are only possible between word memory (16-bit) and word peripherals. The DMA cannot affect the odd address boundary, on either memory or I/O.

The DMA word cycle begins when a peripheral sets a DRQ5-DRQ7 line active. The 8237 then arbitrates among any other pending requests and sets the HOLD request output active. The HOLD request line (DREQ) is then synchronized and arbitrated by the HOLD arbitration logic discussed above.

When the system responds to the DREQ with a HAKDMA, the word 8237 will, after synchronizing the acknowledge, respond with a DAKx acknowledge to the peripheral.

The D4-SCPY PAL drives the SA0 and SBHE* line to a low in order to satisfy 16-bit devices on the bus.

The remainder of the word DMA operation is the same as the byte operation except for the handling of the COPYEN* and COPYHL* signals. These signals are not enabled for word based DMA.

In the preferred embodiment of this invention the BIOS stored in the 16-bit ROM is mapped into RAM. This significantly speeds up the processing time of the processor in that the processor can fetch instructions from RAM at the rate of 32-bits instead of obtaining them from ROM at the rate of 16-bits. The use of a dual mapped BIOS achieves the convenience of a 32-bit memory for BIOS without the cost ramifications of a 32-bit ROM.

The BIOS referred to herein contains the necessary code to interface with most of the system elements in a standard way, to achieve compatibility with earlier generation computers, as well as code to test the system at power up and load code from the floppy or fixed disk subsystems into dynamic memory (RAM). Prior art devices store the software (BIOS) in ROM. Typically these ROMs are connected to the CPU at the CPU's normal data size, i.e., 8-bit for 8088 microprocessors and 16-bit for 8086 and 80286 microprocessors. These 8 and 16-bit ROMs were fast enough for the earlier generation microprocessors in that the access time necessary to meet the requirements of the processor did not materially affect the system performance. With the advent of 32-bit microprocessor, the 8 and 16-bit ROMs cannot be accessed fast enough and therefore result in a considerable degradation of performance of the 80386 microprocessor.

The addition of two additional ROMs to achieve a 32-bit bus width presents an undesirable cost penalty. Since the preferred embodiment of the 80386 microprocessor based personal computer is designed to be compatible with other prior art devices, it has been designed with a 32-bit to 16-bit bus converter to produce a compatible 16-bit bus. The 16-bit bus is a slower bus designed to be compatible with prior art 80286 devices.

The design of the 32-bit RAM subsystem of the preferred embodiment resulted in a minimum RAM size of 1024 kilobytes due to the 32-bit high performance paged RAM design. Since the majority of the software on the current market is not capable of easily using more than 640 kilobytes, 384 kilobytes of memory were available for the dual-mapped BIOS without any cost penalty.

In the preferred embodiment some of the excess RAM (e.g., some of the 384 kilobytes of excess memory) was utilized to hold the ROM code and thereby improve the performance of the 80386 microprocessor. This use of the RAM to store the BIOS, after the computer is powered up, improves the performance of the 80386 microprocessor based computer by improving the access time of the microprocessor to the BIOS. This improvement in the access time is accomplished by increasing the information transferred from memory to the processor, i.e., increasing the transfer rate from 16-bits to 32-bits.

To implement the dual-mapped BIOS in the preferred embodiment, and maintain compatibility with the prior art machines, the ROM code had to remain at its original address and had to be safe from being written over by errant software even though the BIOS had been transferred to RAM. The implementation in the preferred embodiment includes decoding logic which allows the RAM subsystem to respond to the ROM addresses by the CPU and third party software. The additional decoding logic is controllable by software through a writable control port so that the system can switch from operation out of the 16-bit ROM to the 32-bit RAM once the contents of the ROM are written into the 32-bit RAM.

In the preferred embodiment, the personal computer is powered up and begins to execute code from the BIOS stored in the 16-bit ROM. During this initial time, the RAM system necessary to store the BIOS is tested. In the preferred embodiment the BIOS tests the RAM at addresses FE0000 through FFFFFF. The BIOS then initiates the copying of the BIOS into the dynamic memory (RAM).

In the preferred embodiment the BIOS is copied from ROM address space 00E0000h through 00FFFFF to RAM address space FE0000h through 00FFFFFFh.

After the BIOS is copied to RAM, the RAM memory subsystem responds to the following addresses (address range given in hexadecimal):

| ADDRESS RANGE | SIZE | ADDRESS DECODED |
| --- | --- | --- |
| 000000–09FFFF | 640K | when appropriate jumpers are set |
| 0E0000–0FFFFF | 128K | when ROM replacement active (Note) |
| 100000–9FFFFF | 9216K | when expansion RAM is installed |
| F40000–F9FFFF | 384K | when appropriate jumpers are set |
| FA0000–FDFFFF | 256K | always |
| FE0000–FFFFFF | 128K | always (Note) |
| 80C00000 | 1 byte | diagnostic byte (read) address |
| 80C00000 | 1 byte | control byte (write) address |

Note: When ROM replacement is active, writing to this address range can be disabled.

The diagnostic byte (at 80C00000h read only) has several functions. When reading the byte, the value returned is as follows:

| bit 0 | parity status by byte 0 (0 is error) |
| --- | --- |
| bit 1 | parity status by byte 1 (0 is error) |
| bit 2 | parity status of byte 2 (0 is error) |
| bit 3 | parity status of byte 3 (0 is error) |
| bit 4 | 512K jumper status (0 is active) |
| bit 5 | 640K jumper status (0 is active) |
| bit 6 | 1M jumper status (0 is active) |
| bit 7 | 2 or 8 Mbyte option board (0 is installed) |

The 128 kbytes from 0FE0000h to 0FFFFFFh is used to simulate a system ROM. In the original 80286 products, this spaced was occupied by the system ROMs. In the present invention, for the 80386 machines, this space is occupied by RAM on this board. To provide compatibility with previous products, the system ROM is copied to this same space. To allow faster execution of ROM resident software, this board provides the ROM "replacement" function. When replacement is enabled, the RAM board decodes address range 00E0000h to 00FFFFFh and puts the 128k of ROM here, replacing the system ROM. When this is done the original ROMs are disabled.

Upon completion of this step, the BIOS initiates the writing of a control bit which causes the RAM system to take over the ROM address space and from then on the CPU executes the BIOS code out of the high speed RAM at a 32-bit bandwidth. This is accomplished by setting bits at 80C00000H thereby causing the RAM subsystem to take over address space E0000.

The PAL equation below is used in the 80386 memory board to decode addresses within the memory space and assert the M32* signal. It does all the decoding for all the expected options according to the following jumper settings.

M32* indicates that the RAM system is to handle the CPU cycle for the given address.

The jumpers 1M*, 512M*, 640K*, 2M* and 8M* are used to specify different amounts of RAM to the system. (See Memory Board schematics in Appendix B).

The signal ROM is the ROM replacement signal from the control byte.

| 512K | 640K | | | 1M | 1024K expanded |
|------|------|------|----------------|---|----------------|
| H | H | 256K | 000000–03FFFFh | H | No extended memory |
| L | H | 512K | 000000–07FFFFh | L | 1024K 100000–1FFFFFh |
| L | L | 640K | 000000–9FFFFFh | | |
| H | L | **** | ILLEGAL | | |

Daughterboard Jumpers

| 8M | 2M | | |
|----|----|------|----------------|
| H | H | OK | |
| H | L | 2048K | 200000–3FFFFFh |
| L | H | **** | ILLEGAL |
| L | L | 8192K | 200000–9FFFFFh |

The PAL equation used in the preferred embodiment of this invention to decode address within the memory space is:

```
M32 =
   /A31*/A23*/A22*/A21*/A20*/A19*/A18           ;000000–03FFFF 256K
 + /A31*/A23*/A22*/A21*/A20*/A19* A18*     512K ;040000–07FFFF 256K
 + /A31*/A23*/A22*/A21*/A20* A19*/A18*/A17* 640K ;080000–09FFFF 128K
 + /A31*/A23*/A22*/A21*/A20* A19* A18* A17* ROM ;0E0000–0FFFFF 128K
 + /A31* A23* A22* A21* A20*/A19* A18*      /512K ;F40000–F7FFFF 256K
 + /A31* A23* A22* A21* A20* A19*/A18*/A17*/640K ;F80000–F9FFFF 128K
 + /A31* A23* A22* A21* A20* A19*/A18* A17  ;FA0000–FBFFFF 128K
 + /A31* A23* A22* A21* A20* A19* A18       ;FC0000–FFFFFF 256K
 + /A31*/A23*/A22*/A21* A20*            1M  ;100000–1FFFFF 1M
 + /A31*/A23*/A22* A21*                 2M  ;200000–3FFFFF 2M
 + /A31*/A23* A22*/A21*                 8M  ;400000–5FFFFF 2M
 + /A31*/A23* A22* A21*                 8M  ;600000–7FFFFF 2M
 + /A31* A23*/A22*/A21*                 8M  ;800000–9FFFFF 2M
 +  A31* A23* A22*/A21*/A20*/A19*/A18*/A17  ;DAIG 80C0000h 128K
```

Since normal system ROMs could not be written, a write protect function is included in the RAM board for two address spaces. When replacement is not enabled, only 0FE0000h to 0FFFFFFh is protected (the normal ROM space still contains the unwritable ROM). When replacement is active, both spaces can be protected. After POWERUP, the write protect function is disabled.

The write protect control byte (at 80C00000h write only) is shown below.

| bit 0 | ROM replacement (0 replaces) |
|-------|------------------------------|
| bit 1 | ROM space write protect (0 protects) |
| bit 2 | reserved (write a 1) |
| bit 3 | reserved (write a 1) |
| bit 4 | reserved (write a 1) |
| bit 5 | reserved (write a 1) |
| bit 6 | reserved (write a 1) |
| bit 7 | reserved (write a 1) |

The control byte is also used to clear the diagnostic byte parity status. When writing this byte (with any value) the parity status bits will be reset to ones.

The following PAL equations are used in the 80386 memory board to decode the RAS signals and the parity read and write logic. In the equation below the terms used are:

RS0 is the decoded RAM select signal for bank 0 (where the ROM replacement is done).

WE0 is the write enable line to the bank 0 RAMs. This line controls the write protection of the ROM replacement RAM.

WPRT is the ROM write protect signal from the control port.

RFSH is a signal indicating a refresh cycle is to be done.

```
RS0 =
    /A31*/A23*/A22*/A21*/A20*/A19                      ;00000000H 512K
  + /A31*/A23*/A22*/A21*/A20* A19*/A18*/A17            ;00080000H 128K
  + /A31*/A23*/A22*/A21*/A20* A19* A18* A17            ;000E0000H 128K
  + /A31* A23* A22* A21* A20*                          ;00F00000H 1024K
  + RFSH                                               ;REFRESH
WE0 =
    MWE*/A31*/A23*/A22*/A21*    /A19                   ;00000000H 512K
  +MWE*/A31*/A23*/A22*/A21*/A20* A19*/A18*/A17         ;00080000H 128K
  +MWE*/A31*/A23*/A22*/A21*/A20* A19* A18* A17*/WPRT   ;000E0000H 128K
  +MWE*/A31* A23* A22* A21* A20*/A19* A18              ;00F40000H 256K
  +MWE*/A31* A23* A22* A21* A20* A19*/A18              ;00F80000H 256K
  +MWE*/A31* A23* A22* A21* A20* A19* A18*/A17*        ;00FC0000H 128K
  +MWE*/A31* A23* A22* A21* A20* A19* A18* A17*/WPRT   ;00FE0000H 128K
```

After the BIOS is loaded into RAM, additional system testing (i.e., disks, clock and other I/O devices) continues and the balance of the installed dynamic memory (not previously tested) is tested. Error reports are generated as appropriate.

Once the machine testing is concluded, the boot sector is loaded into the dynamic memory from the floppy diskette or the hard disk. Thereafter the execution of the boot sector code is commenced.

The instructions to transfer the BIOS from ROM to RAM are set forth in two subroutines stored in the BIOS. The source code of those subroutines is set forth in two listings bearing the titles CLEARMEM.LST and TESTHRAM.LST. The TESTHRAM.LST and CLEARMEM.LST source code listings are attached hereto as Appendices R, copies of which are available in the application file and S respectively and incorporated by reference from U.S. Pat. No. 4,787,032, issued on Nov. 22, 1988 as if set forth in full herein. The listing for CLEARMEM.LST contains the routine, clr—mem, which calls routine MovSysROM found in routine TESTHRAM.LST. MovSysROM will move the BIOS code in ROM to the RAM space and write the BIOS to the memory locations that replaces the ROM address space. The MovSysROM also write protects the RAM after the BIOS is written into RAM.

Complete listings of PAL equations for the ROM replacement are set forth in Appendices P and Q. The listing entitled D4-SROMA.PAL represents a listing of the PAL equations for the ROM decode logic contained in device U26.

The listing entitled D4-RM32.PAL represents a listing of the PAL equations for the M32 PAL otherwise indicated as device U7.

The listing entitled D4-RRAS.PAL represents of the PAL equations for the logic contained in device U18.

In describing the invention, reference has been made to a preferred embodiment. However, those skilled in the art and familiar with the disclosure of the invention may recognize additions, deletions, substitutions, or other modifications which would fall within the purview of the invention as defined in the appended claims.

What is claimed is:

1. A personal computer comprising:
   a microprocessor having address and data lines;
   a high speed data bus connected to said microprocessor data lines for transferring data to and from said microprocessor;
   non-volatile memory associated with said microprocessor for storing microprocessor program steps and data and having address and data lines, said address lines being coupled to said microprocessor address lines to initially appear at a defined address space;
   a slow speed data bus connected to said non-volatile memory data lines for transferring data from said non-volatile memory;
   a bus controller connected to said high speed data bus and said slow speed data bus for transferring data between said data buses;
   dynamic memory associated with said microprocessor having address and data lines, said address lines being coupled to said microprocessor address lines to appear at a defined address space, said address space initially excluding said address space of said non-volatile memory, and said data lines being connected to said high speed data bus;
   means coupled to said dynamic memory, said non-volatile memory, said microprocessor and said bus controller for controlling transfer of said microprocessor program steps from said non-volatile memory at said non-volatile memory address space to said dynamic memory at an address space other than said non-volatile memory address space; and
   means coupled to said non-volatile memory and said dynamic memory for removing said non-volatile memory from the address space of the address space of said microprocessor and relocating the portion of said dynamic memory having received said microprocessor program steps from said non-volatile memory to the former address space of said non-volatile memory after said microprocessor program steps are transferred,
   wherein said microprocessor operates from said microprocessor program steps stored in said non-volatile memory prior to relocation of said dynamic memory portion and from said transferred microprocessor program steps stored in said relocated dynamic memory portion after relocation.

2. The personal computer described in claim 1 wherein said dynamic memory has a larger addressable memory bandwidth than said non-volatile memory.

3. The personal computer described in claim 1 wherein the dynamic memory is a 32-bit random access memory and the non-volatile memory is a 16-bit read only memory.

4. The personal computer described in claim 1 further comprising means coupled to said microprocessor and said dynamic memory and controllable by said microprocessor for preventing additional data from being written into said dynamic memory address space occupied by said microprocessor program steps transferred from said non-volatile memory.

* * * * *

UNITED STATES PATENT AND TRADEMARK OFFICE
CERTIFICATE OF CORRECTION

PATENT NO. : 5,109,521
DATED : April 28, 1992
INVENTOR(S) : Paul R. Culley

It is certified that error appears in the above-identified patent and that said Letters Patent is hereby corrected as shown below:

In Col. 30, Line 23, please move the phrase "the address space of" to Col. 30, Line 24, after "relocating".

Signed and Sealed this

Thirty-first Day of August, 1993

Attest:

BRUCE LEHMAN

Attesting Officer

Commissioner of Patents and Trademarks